(12) United States Patent
Lawniczek et al.

(10) Patent No.: US 12,163,489 B2
(45) Date of Patent: Dec. 10, 2024

(54) AERONAUTICAL PROPULSION SYSTEM

(71) Applicant: SAFRAN AIRCRAFT ENGINES, Paris (FR)

(72) Inventors: Baptiste Dorian Lawniczek, Moissy-Cramayel (FR); Didier René André Escure, Moissy-Cramayel (FR); Alexandre Thanh Nhan Nguyen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/541,252

(22) Filed: Dec. 15, 2023

(65) Prior Publication Data

US 2024/0200509 A1 Jun. 20, 2024

(30) Foreign Application Priority Data

Dec. 16, 2022 (FR) ...................................... 2213622
Dec. 13, 2023 (FR) ...................................... 2314117

(51) Int. Cl.
*F02K 3/06* (2006.01)
*F01D 5/02* (2006.01)
(Continued)

(52) U.S. Cl.
CPC .................. *F02K 3/06* (2013.01); *F01D 5/02* (2013.01); *F01D 5/12* (2013.01); *F01D 5/3007* (2013.01);
(Continued)

(58) Field of Classification Search
CPC ..... F02K 3/06; F01D 5/02; F01D 5/12; F01D 5/3007; F01D 5/03; F02C 3/113; F05D 2220/323; F05D 2220/36; F05D 2230/51
See application file for complete search history.

(56) References Cited

U.S. PATENT DOCUMENTS

| 5,443,365 A * | 8/1995 | Ingling | F01D 5/141 |
| | | | 416/193 A |
| 2013/0192266 A1* | 8/2013 | Houston | F02C 7/36 |
| | | | 60/805 |

(Continued)

FOREIGN PATENT DOCUMENTS

| EP | 3 591 191 A1 | 8/2020 |
| EP | 3 708 819 A1 | 9/2020 |

OTHER PUBLICATIONS

Preliminary French Search Report for FR 22 13 622 dated Jun. 30, 2023.

*Primary Examiner* — Woody A Lee, Jr.
*Assistant Examiner* — Joshua R Beebe
(74) *Attorney, Agent, or Firm* — Sughrue Mion, PLLC

(57) ABSTRACT

A propulsion system includes a drive shaft, a drive turbine including a drive turbine rotor having a turbine disk and turbine blades, and a fan section. The turbine disk has an inner surface, an outer surface, a bore radius, and a rim radius. One or more of the turbine blades includes a root fixed to the turbine disk in a respective slot, a stilt connected to the root and including a platform, and an airfoil connected to the platform and extending within a flowpath. The flowpath includes an outer radius and an inner radius. The drive shaft has a limit speed. The bore radius, the rim radius, the outer radius, the inner radius, and the limit speed satisfy a given relationship.

20 Claims, 9 Drawing Sheets

(51) Int. Cl.
   *F01D 5/12*     (2006.01)
   *F01D 5/30*     (2006.01)
   *F02C 3/113*    (2006.01)

(52) U.S. Cl.
   CPC ........ *F02C 3/113* (2013.01); *F05D 2220/323* (2013.01); *F05D 2220/36* (2013.01); *F05D 2230/51* (2013.01)

(56)             References Cited

U.S. PATENT DOCUMENTS

| 2017/0343015 | A1* | 11/2017 | Nolcheff | F04D 17/025 |
| 2020/0200097 | A1* | 6/2020  | Stretton | F02C 7/057  |
| 2021/0071586 | A1* | 3/2021  | Dunning  | F02K 3/06   |
| 2021/0301827 | A1* | 9/2021  | Stretton | F01D 5/141  |
| 2021/0310407 | A1* | 10/2021 | Bemment  | F02K 3/06   |

* cited by examiner

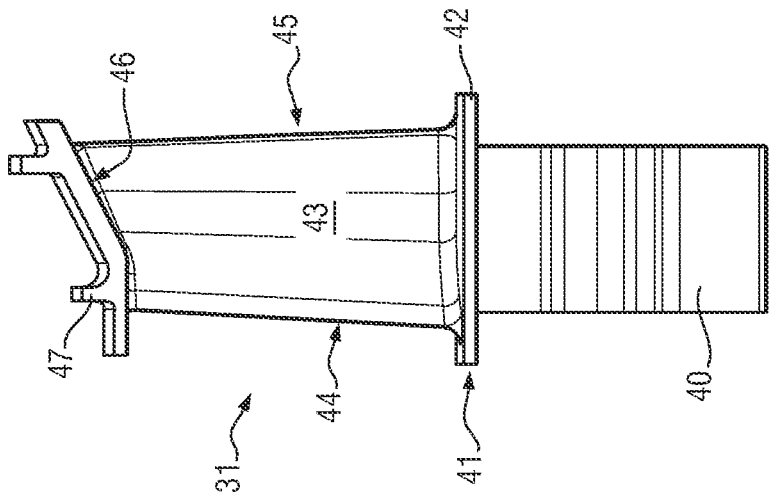
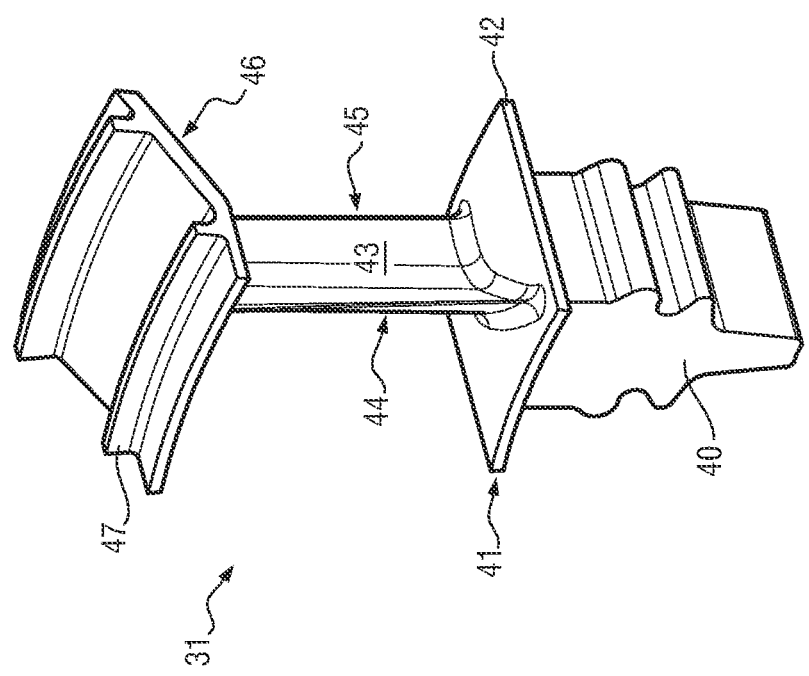
Fig. 8A
Fig. 8B

AERONAUTICAL PROPULSION SYSTEM

TECHNICAL FIELD

The present disclosure generally relates to the field of propulsion systems, and more particularly aeronautical propulsion systems.

STATE OF THE ART

An aeronautical propulsion system generally includes, from upstream to downstream in the gas flow direction, a fan section, a compressor section which can comprise a low-pressure compressor and a high-pressure compressor, a combustion chamber and a turbine section which can comprise a high-pressure turbine and a low-pressure turbine. The high-pressure compressor is driven in rotation by the high-pressure turbine via a high-pressure shaft. The fan and, where applicable, the low-pressure compressor are driven in rotation by the low-pressure turbine via a low-pressure shaft.

The technological research efforts have already made it possible to very significantly improve the environmental performances of the aircrafts. In particular, the relevant factors in all the design and development phases have been taken into account to obtain aeronautical components and products that are less energy-intensive, more respectful of the environment and whose integration and use in the civil aviation have moderate environmental consequences, with the aim of improving the energy efficiency of the aircrafts.

For example, in order to improve the propulsive efficiency of an aeronautical propulsion system and reduce its specific consumption, it has been found that it is advantageous to seek to increase the rotation speed of the low-pressure shaft and/or of the high-pressure shaft. Likewise, in order to limit the drag and mass of the aircraft, and thus reduce its fuel consumption, it has been found that it is advantageous to seek to make its propulsion systems more compact, that is to say to reduce the bulk of all or part of their components.

However, in doing so, it appears that the rotating components of the aeronautical propulsion systems, in particular those present within the compressor section and the turbine section, are subjected to centrifugal forces which become more significant, while having smaller dimensions, which is likely to alter their mechanical strength and/or limit their lifespan.

GENERAL DISCLOSURE

One aim of the present disclosure is to reduce the fuel consumption of an aeronautical propulsion system without limiting the lifespan of its rotating components.

For this purpose, according to one aspect of the present disclosure, an aeronautical propulsion system is proposed comprising:
- a drive shaft;
- a drive turbine comprising a drive turbine stator and a drive turbine rotor, the drive turbine rotor being connected to the drive shaft to drive it in rotation relative to the drive turbine stator about a longitudinal axis, the drive turbine rotor comprising a turbine disk and a plurality of turbine blades;
- a fan section comprising a fan rotor and a fan stator, the drive shaft being connected to the fan rotor to drive it in rotation relative to the fan stator about the longitudinal axis;

wherein the turbine disk is centered on the longitudinal axis and has:
- an inner surface delimiting a circular bore passing through the turbine disk and centered on the longitudinal axis;
- an outer surface delimiting a plurality of slots distributed about the longitudinal axis;
- a bore radius $R_a$ which is defined as a smallest distance between the longitudinal axis and the inner surface of the turbine disk; and
- a rim radius $R_j$ which is defined as a smallest distance between the longitudinal axis and the outer surface of the turbine disk;

wherein at least one turbine blade of the plurality of turbine blades further comprises:
- a root fixed to the turbine disk in a respective slot of the plurality of slots;
- a stilt connected to the root and comprising a platform delimiting a radially inner portion of a flowpath passing through the drive turbine; and
- an airfoil connected to the platform and extending within the flowpath, the airfoil having a leading edge, a trailing edge and an end opposite to the platform;

wherein the flowpath has:
- an outer radius $R_e$ which is defined as an average between, on the one hand, a distance between the longitudinal axis and a junction between the end of the airfoil and the leading edge of the airfoil and, on the other hand, a distance between the longitudinal axis and a junction between the end of the airfoil and the trailing edge of the airfoil; and
- an inner radius $R_i$ which is defined as an average between, on the one hand, a distance between the longitudinal axis and a junction between the platform and the leading edge of the airfoil and, on the other hand, a distance between the longitudinal axis and a junction between the platform and the trailing edge of the airfoil;

wherein the drive shaft has a limit speed $\omega$ which is defined as the highest speed at which the drive shaft is capable of being driven in rotation about the longitudinal axis during the operation of the propulsion system;

wherein the bore radius $R_a$, the rim radius $R_j$, the outer radius $R_e$, the inner radius $R_i$ and the limit speed $\omega$ are such that:

$$\kappa * N2S + \lambda_1 \le \frac{R_a}{R_j}$$

with:

$$N2S = \pi * (R_e^2 - R_i^2) * \omega^2$$

where:
$\omega$ is expressed in revolutions per minute;
$\kappa$ is $-0.0091$ rpm$^{-2}$·m$^{-2}$;
$\lambda_1$ is 0.3;
$R_a$, $R_j$, $R_e$ and $R_i$ are expressed in meters; and
$N2S$ is expressed in $10^6$·rpm$^2$·m$^2$;
wherein the ratio $$\frac{R_a}{R_j}$$

is strictly positive and strictly less than 1;

wherein the bore radius $R_a$ is comprised in a range from 0.01 to 0.5 meters inclusive, the rim radius $R_j$ is comprised in a range from 0.01 to 0.5 meters inclusive, the limit speed $\omega$ is comprised in a range from 2,000 rpm to 30,000 rpm inclusive, the outer radius $R_e$ is comprised in a range from 0.15 to 1.0 meters inclusive, the inner radius $R_i$ is comprised in a range from 0.1 to 0.8 meters inclusive and N2S is comprised in a range from $30*10^6$ rpm$^2$·m$^2$ to $180*10^6$ rpm$^2$·m$^2$ inclusive.

In one embodiment, the bore radius $R_a$, the rim radius $R_j$, the outer radius $R_e$, the inner radius $R_i$ and the limit speed $\omega$ are such that:

$$\kappa * N2S + \lambda_2 \leq \frac{R_a}{R_j}$$

where:
$\kappa$ is $-0.0091$ rpm$^{-2}$·m$^{-2}$;
$\lambda_2$ is 0.864;
$R_a$ and $R_j$ are expressed in meters; and
N2S is expressed in $10^6$·rpm$^2$·m$^2$.

In one embodiment, the bore radius $R_a$, the rim radius $R_j$ and the limit speed $\omega$ are such that:

$$\alpha * U_j + \beta_1 \leq \frac{R_a}{R_j}$$

with:

$$U_j = R_j * \omega$$

where:
$\omega$ is expressed in radians per second; $\alpha$ is $-0.0027$ m$^{-1}$·s;
$\beta_1$ is 0.4;
$R_a$ and $R_j$ are expressed in meters; and
$U_j$ is expressed in meters per second;
wherein $U_j$ is comprised in a range from 100 to 500 m·s$^{-1}$ inclusive.

In one embodiment, the bore radius $R_a$, the rim radius $R_j$ and the limit speed $\omega$ are such that:

$$\alpha * U_j + \beta_2 \leq \frac{R_a}{R_j}$$

where;
$\alpha$ is $-0.0027$ m$^{-1}$·s;
$\beta_2$ is 1.2951;
$R_a$ and $R_j$ are expressed in meters; and
$U_j$ is expressed in meters per second.

In one embodiment, the inner surface of the turbine disk has an upstream edge and a downstream edge and the turbine disk further has a bore width $L_a$ which is defined as an axial distance between the upstream edge and the downstream edge of the inner surface; and
wherein the bore width $L_a$, the rim radius $R_j$ and the limit speed $\omega$ are such that:

$$\frac{100 * L_a}{R_j} \leq \delta * \frac{U_j^2}{1,000} + \zeta_1$$

with:

$$U_j = R_j * \omega$$

where:
$\omega$ is expressed in radians per second;
$\delta$ is 0.2424 s$^2$·m$^{-2}$;
$\zeta_1$ is 10;
$L_a$ and $R_j$ are expressed in meters; and
$U_j$ is expressed in meters per second;
wherein the ratio $$\frac{100 * L_a}{R_j}$$

is strictly positive;
wherein the bore width $L_a$ is comprised in a range from 0.005 to 0.1 meters inclusive and $U_j$ is comprised in a range from 100 to 500 m·s$^{-1}$ inclusive.

In one embodiment, the bore width $L_a$, the rim radius $R_j$ and the limit speed $\omega$ are such that:

$$\frac{100 * L_a}{R_j} \leq \delta * \frac{U_j^2}{1,000} + \zeta_2$$

where:
$\delta$ is 0.2424 s$^2$·m$^{-2}$;
$\zeta_2$ is $-8$;
$L_a$ and $R_j$ are expressed in meters; and
$U_j$ is expressed in meters per second.

In one embodiment, the inner surface of the turbine disk has an upstream edge and a downstream edge and the turbine disk further has a bore width $L_a$ which is defined as an axial distance between the upstream edge and the downstream edge of the inner surface; and
wherein the bore width $L_a$, the inner radius $R_i$ and the limit speed $\omega$ are such that:

$$\frac{100 * L_a}{R_i} \leq \nu * \frac{U_i^2}{1,000} + \xi_1$$

with:

$$U_i = R_i * \omega$$

where:
$\omega$ is expressed in radians per second;
$\nu$ is 0.079 s$^2$·m$^{-2}$;
$\xi_1$ is 2.28;
$L_a$ and $R_i$ are expressed in meters; and
$U_i$ is expressed in meters per second;
wherein the ratio $$\frac{100 * L_a}{R_i}$$

is strictly positive;
wherein the bore width $L_a$ is comprised in a range from 0.005 to 0.1 meters inclusive and $U_i$ is comprised in a range from 100 to 500 m·s$^{-1}$ inclusive.

In one embodiment, the bore width $L_a$, the inner radius $R_i$ and the limit speed $\omega$ are such that:

$$\frac{100 * L_a}{R_i} \leq \nu * \frac{U_i^2}{1{,}000} + \xi_2$$

where:
$\nu$ is 0.079 s²·m⁻²;
$\xi_2$ is −1.41;
$L_a$ and $R_i$ are expressed in meters; and
$U_i$ is expressed in meters per second.

In one embodiment, the drive turbine rotor comprises a plurality of shrouds, a plurality of turbine disks connected in pairs by a shroud of the plurality of shrouds, and a plurality of turbine blades;
  wherein at least one shroud of the plurality of shrouds connects an upstream turbine disk to a downstream turbine disk of the plurality of turbine disks and has:
    an outer surface facing the drive turbine stator; and
    a shroud radius $R_v$ which is defined as a smallest distance between the longitudinal axis and the outer surface of the shroud;
  wherein each of the upstream turbine disk and of the downstream turbine disk is centered on the longitudinal axis and has an outer surface delimiting a plurality of slots distributed about the longitudinal axis;
  wherein a first turbine blade of the plurality of turbine blades comprises:
    a root fixed to the upstream turbine disk in a respective slot of the plurality of slots of the upstream turbine disk;
    a stilt connected to the root and comprising a platform delimiting a first radially inner portion of a flowpath passing through the drive turbine; and
    an airfoil connected to the platform and extending within the flowpath, the airfoil having a leading edge, a trailing edge and an end opposite to the platform;
  wherein a second turbine blade of the plurality of turbine blades comprises:
    a root fixed to the downstream turbine disk in a respective slot of the plurality of slots of the downstream turbine disk;
    a stilt connected to the root and comprising a platform delimiting a second radially inner portion of the flowpath passing through the drive turbine; and
    an airfoil connected to the platform and extending within the flowpath, the airfoil having a leading edge, a trailing edge and an end opposite to the platform;
  wherein the flowpath has:
    an upstream outer radius $R_{eam}$ which is defined as an average between, on the one hand, a distance between the longitudinal axis and a junction between the end of the airfoil of the first turbine blade and the leading edge of the airfoil of the first turbine blade and, on the other hand, a distance between the longitudinal axis and a junction between the end of the airfoil of the first turbine blade and the trailing edge of the airfoil of the first turbine blade;
    an upstream inner radius $R_{iam}$ which is defined as an average between, on the one hand, a distance between the longitudinal axis and a junction between the platform of the first turbine blade and the leading edge of the airfoil of the first turbine blade and, on the other hand, a distance between the longitudinal axis and a junction between the platform of the first turbine blade and the trailing edge of the airfoil of the first turbine blade;
    a downstream outer radius $R_{eav}$ which is defined as an average between, on the one hand, a distance between the longitudinal axis and a junction between the end of the airfoil of the second turbine blade and the leading edge of the airfoil of the second turbine blade and, on the other hand, a distance between the longitudinal axis and a junction between the end of the airfoil of the second turbine blade and the trailing edge of the airfoil of the second turbine blade; and
    a downstream inner radius $R_{iav}$ which is defined as an average between, on the one hand, a distance between the longitudinal axis and a junction between the platform of the second turbine blade and the leading edge of the airfoil of the second turbine blade and, on the other hand, a distance between the longitudinal axis and a junction between the platform of the second turbine blade and the trailing edge of the airfoil of the second turbine blade;
  wherein the shroud radius $R_v$, the upstream outer radius $R_{eam}$, the upstream inner radius $R_{iam}$, the downstream outer radius $R_{eav}$, the downstream inner radius $R_{iav}$ and the limit speed $\omega$ are such that:

$$\sigma_1 * \frac{N2S_{am}}{100} + \chi_1 \leq \frac{R_v}{R_m}$$

with:

$$N2S_{am} = \pi * \left(R_{eam}^2 - R_{iam}^2\right) * \omega^2$$

and:

$$R_m = \frac{\frac{R_{eam} + R_{iam}}{2} + \frac{R_{eav} + R_{iav}}{2}}{2}$$

where:
$\omega$ is expressed in revolutions per minute;
$\sigma_1$ is −0.4 rpm⁻²·m⁻²;
$\chi_1$ is 0.784;
$R_{eam}$, $R_{iam}$, $R_{eav}$, $R_{iav}$ and $R_v$ are expressed in meters; and
$N2S_{am}$ is expressed in 10⁶·rpm²·m²;
wherein the ratio $$\frac{R_v}{R_m}$$

is strictly positive and strictly less than 1;
  wherein the shroud radius $R_v$ is comprised in a range from 0.05 to 0.8 meters inclusive, the upstream outer radius $R_{eam}$ and the downstream outer radius $R_{eav}$ are comprised in a range from 0.15 to 1.0 meters inclusive, the downstream inner radius $R_{iav}$ and the upstream inner radius $R_{iam}$ are comprised in a range from 0.1 to 0.8 meters inclusive, $R_m$ is comprised in a range from 0.05 to 1.0 meters inclusive and $N2S_{am}$ is comprised in a range from 30*10⁶ rpm²·m² to 180*10⁶ rpm²·m² inclusive.

In one embodiment, the shroud radius $R_v$, the upstream outer radius $R_{eam}$, the upstream inner radius $R_{iam}$, the downstream outer radius $R_{eav}$, the downstream inner radius $R_{iav}$ and the limit speed ω are such that:

$$\sigma_2 * \frac{N2S_{am}}{100} + \chi_2 \le \frac{R_v}{R_m}$$

where:
$\sigma_2$ is −0.512 rpm$^{-2}$·m$^{-2}$
$\chi_2$ is 0.82;
$R_m$ and $R_v$ are expressed in meters; and
$N2S_{am}$ is expressed in $10^6$·rpm$^2$·m$^2$.

According to another aspect of the present disclosure, a method for manufacturing a propulsion system is proposed, the propulsion system comprising:
a drive shaft;
a drive turbine comprising a drive turbine stator and a drive turbine rotor, the drive turbine rotor being connected to the drive shaft to drive it in rotation relative to the drive turbine stator about a longitudinal axis, the drive turbine rotor comprising a turbine disk and a plurality of turbine blades;
a fan section comprising a fan rotor and a fan stator, the drive shaft being connected to the fan rotor to drive it in rotation relative to the fan stator about the longitudinal axis;
wherein the turbine disk is centered on the longitudinal axis and has:
an inner surface delimiting a circular bore passing through the turbine disk and centered on the longitudinal axis;
an outer surface delimiting a plurality of slots distributed about the longitudinal axis;
a bore radius $R_a$ which is defined as a smallest distance between the longitudinal axis and the inner surface of the turbine disk; and
a rim radius $R_j$ which is defined as a smallest distance between the longitudinal axis and the outer surface of the turbine disk;
wherein at least one turbine blade of the plurality of turbine blades comprises:
a root fixed to the turbine disk in a respective slot of the plurality of slots;
a stilt connected to the root and comprising a platform delimiting a radially inner portion of a flowpath passing through the drive turbine; and
an airfoil connected to the platform and extending within the flowpath, the airfoil having a leading edge, a trailing edge and an end opposite to the platform;
wherein the flowpath has:
an outer radius $R_e$ which is defined as an average between, on the one hand, a distance between the longitudinal axis and a junction between the end of the airfoil and the leading edge of the airfoil and, on the other hand, a distance between the longitudinal axis and a junction between the end of the airfoil and the trailing edge of the airfoil; and
an inner radius $R_i$ which is defined as an average between, on the one hand, a distance between the longitudinal axis and a junction between the platform and the leading edge of the airfoil and, on the other hand, a distance between the longitudinal axis and a junction between the platform and the trailing edge of the airfoil;
wherein the drive shaft has a limit speed ω which is defined as the highest speed at which the drive shaft is capable of being driven in rotation about the longitudinal axis during the operation of the propulsion system;
wherein the method comprises a dimensioning of the at least one turbine blade, and a dimensioning of the turbine disk implemented so that the bore radius $R_a$, the rim radius $R_j$, the outer radius $R_e$, the inner radius $R_i$ and the limit speed ω are such that:

$$\kappa * N2S + \lambda_1 \le \frac{R_a}{R_j}$$

with:

$$N2S = \pi * (R_e^2 - R_i^2) * \omega^2$$

where:
ω is expressed in revolutions per minute;
κ is −0.0091 rpm$^{-2}$·m$^{-2}$;
$\lambda_1$ is 0.3;
$R_a$, $R_j$, $R_e$ and $R_i$ are expressed in meters; and
N2S is expressed in $10^6$·rpm$^2$·m$^2$;
wherein the ratio $$\frac{R_a}{R_j}$$

is strictly positive and strictly less than 1;
wherein the bore radius $R_a$ is comprised in a range from 0.01 to 0.5 meters inclusive, the rim radius $R_j$ is comprised in a range from 0.01 to 0.5 meters inclusive, the limit speed ω is comprised in a range from 2,000 rpm to 30,000 rpm inclusive, the outer radius $R_e$ is comprised in a range from 0.15 to 1.0 meters inclusive, the inner radius $R_i$ is comprised in a range from 0.1 to 0.8 meters inclusive and N2S is comprised in a range from 30*$10^6$ rpm$^2$·m$^2$ to 180*$10^6$ rpm$^2$·m$^2$ inclusive.

According to one mode of implementation, the dimensioning of the at least one turbine blade and the dimensioning of the turbine disk are implemented so that bore radius $R_a$, the rim radius $R_j$, the outer radius $R_e$, the inner radius $R_i$ and the limit speed ω are such that:

$$\kappa * N2S + \lambda_2 \le \frac{R_a}{R_j}$$

where:
κ is −0.0091 rpm$^{-2}$·m$^{-2}$;
$\lambda_2$ is 0.864;
$R_a$ and $R_j$ are expressed in meters; and
N2S is expressed in $10^6$·rpm$^2$·m$^2$.

According to one mode of implementation, the dimensioning of the turbine disk is further implemented so that the bore radius $R_a$, the rim radius $R_j$ and the limit speed ω are such that:

$$\alpha * U_j + \beta_1 \leq \frac{R_a}{R_j}$$

with:

$$U_j = R_j * \omega$$

where:
ω is expressed in radians per second;
α is −0.0027 m⁻¹·s;
$\beta_1$ is 0.4;
$R_a$ and $R_j$ are expressed in meters; and
$U_j$ is expressed in meters per second;
wherein $U_j$ is comprised in a range from 100 to 500 m·s⁻¹ inclusive.

According to one mode of implementation, the dimensioning of the turbine disk is further implemented so that the bore radius $R_a$, the rim radius $R_j$ and the limit speed ω are such that:

$$\alpha * U_j + \beta_2 \leq \frac{R_a}{R_j}$$

Where:
α is −0.0027 m⁻¹·s;
$\beta_2$ is 1.2951;
$R_a$ and $R_j$ are expressed in meters; and
$U_j$ is expressed in meters per second.

According to one mode of implementation, the inner surface of the turbine disk has an upstream edge and a downstream edge and the turbine disk further has a bore width $L_a$ which is defined as an axial distance between the upstream edge and the downstream edge of the inner surface; and
wherein the dimensioning of the turbine disk is further implemented so that the bore width $L_a$, the rim radius $R_j$ and the limit speed ω are such that:

$$\frac{100 * L_a}{R_j} \leq \delta * \frac{U_j^2}{1{,}000} + \zeta_1$$

with:

$$U_j = R_j * \omega$$

where:
ω is expressed in radians per second;
δ is 0.2424 s²·m⁻²;
$\zeta_1$ is 10;
$L_a$ and $R_j$ are expressed in meters; and
$U_j$ is expressed in meters per second;
wherein the ratio $$\frac{100 * L_a}{R_j}$$

is strictly positive;
wherein the bore width $L_a$ is comprised in a range from 0.005 to 0.1 meters inclusive and $U_j$ is comprised in a range from 100 to 500 m·s⁻¹ inclusive.

According to one mode of implementation, the dimensioning of the turbine disk is further implemented so that the bore width $L_a$, the rim radius $R_j$ and the limit speed ω are such that:

$$\frac{100 * L_a}{R_j} \leq \delta * \frac{U_j^2}{1{,}000} + \zeta_2$$

where:
δ is 0.2424 s²·m⁻²;
$\zeta_2$ is −8;
$L_a$ and $R_j$ are expressed in meters; and
$U_j$ is expressed in meters per second.

According to one mode of implementation, the inner surface of the turbine disk has an upstream edge and a downstream edge and the turbine disk further has a bore width $L_a$ which is defined as an axial distance between the upstream edge and the downstream edge of the inner surface; and
wherein the dimensioning of the at least one turbine blade and the dimensioning of the turbine disk are further implemented so that the bore width $L_a$, the inner radius $R_i$ and the limit speed ω are such that:

$$\frac{100 * L_a}{R_i} \leq \nu * \frac{U_i^2}{1{,}000} + \xi_1$$

with:

$$U_i = R_i * \omega$$

where:
ω is expressed in radians per second;
ν is 0.079 s²·m⁻²;
$\xi_1$ is 2.28;
$L_a$ and $R_i$ are expressed in meters; and
$U_i$ is expressed in meters per second;
wherein the ratio $$\frac{100 * L_a}{R_i}$$

is strictly positive;
wherein the bore width $L_a$ is comprised in a range from 0.005 to 0.1 meters inclusive and $U_i$ is comprised in a range from 100 to 500 m·s⁻¹ inclusive.

According to one mode of implementation, the dimensioning of the at least one turbine blade and the dimensioning of the turbine disk are implemented so that the bore width $L_a$, the inner radius $R_i$ and the limit speed w are such that:

$$\frac{100 * L_a}{R_i} \leq \nu * \frac{U_i^2}{1{,}000} + \xi_2$$

where:
v is 0.079 s²·m⁻²;
$\xi_2$ is −1.41;
$L_a$ and $R_i$ are expressed in meters; and
$U_i$ is expressed in meters per second.

According to one mode of implementation, the drive turbine rotor comprises a plurality of shrouds, a plurality of turbine disks connected in pairs by a shroud of the plurality of shrouds, and a plurality of turbine blades;
  wherein at least one shroud of the plurality of shrouds connects an upstream turbine disk to a downstream turbine disk of the plurality of turbine disks and has:
    an outer surface facing the drive turbine stator; and
    a shroud radius $R_v$ which is defined as a smallest distance between the longitudinal axis and the outer surface of the shroud;
  wherein each of the upstream turbine disk and of the downstream turbine disk is centered on the longitudinal axis and has an outer surface delimiting a plurality of slots distributed about the longitudinal axis;
  wherein a first turbine blade of the plurality of turbine blades comprises:
    a root fixed to the upstream turbine disk in a respective slot of the plurality of slots of the upstream turbine disk;
    a stilt connected to the root and comprising a platform delimiting a first radially inner portion of a flowpath passing through the drive turbine; and
    an airfoil connected to the platform and extending within the flowpath, the airfoil having a leading edge, a trailing edge and an end opposite to the platform;
  wherein a second turbine blade of the plurality of turbine blades comprises:
    a root fixed to the downstream turbine disk in a respective slot of the plurality of slots of the downstream turbine disk;
    a stilt connected to the root and comprising a platform delimiting a second radially inner portion of the flowpath passing through the drive turbine; and
    an airfoil connected to the platform and extending within the flowpath, the airfoil having a leading edge, a trailing edge and an end opposite to the platform;
  wherein the flowpath has:
    an upstream outer radius $R_{eam}$ which is defined as an average between, on the one hand, a distance between the longitudinal axis and a junction between the end of the airfoil of the first turbine blade and the leading edge of the airfoil of the first turbine blade and, on the other hand, a distance between the longitudinal axis and a junction between the end of the airfoil of the first turbine blade and the trailing edge of the airfoil of the first turbine blade;
    an upstream inner radius $R_{iam}$ which is defined as an average between, on the one hand, a distance between the longitudinal axis and a junction between the platform of the first turbine blade and the leading edge of the airfoil of the first turbine blade and, on the other hand, a distance between the longitudinal axis and a junction between the platform of the first turbine blade and the trailing edge of the airfoil of the first turbine blade;
    a downstream outer radius $R_{eav}$ which is defined as an average between, on the one hand, a distance between the longitudinal axis and a junction between the end of the airfoil of the second turbine blade and the leading edge of the airfoil of the second turbine blade and, on the other hand, a distance between the longitudinal axis and a junction between the end of the airfoil of the second turbine blade and the trailing edge of the airfoil of the second turbine blade; and
    a downstream inner radius $R_{iav}$ which is defined as an average between, on the one hand, a distance between the longitudinal axis and a junction between the platform of the second turbine blade and the leading edge of the airfoil of the second turbine blade and, on the other hand, a distance between the longitudinal axis and a junction between the platform of the second turbine blade and the trailing edge of the airfoil of the second turbine blade;
  wherein the method further comprises a dimensioning of the at least one shroud, a dimensioning of the first turbine blade and a dimensioning of the second turbine blade implemented so that the shroud radius $R_v$, the upstream outer radius $R_{eam}$, the upstream inner radius $R_{iam}$, the downstream outer radius $R_{eav}$, the downstream inner radius $R_{iav}$ and the limit speed $\omega$ are such that:

$$\sigma_1 * \frac{N2S_{am}}{100} + \chi_1 \leq \frac{R_v}{R_m}$$

with:

$$N2S_{am} = \pi * (R_{eam}^2 - R_{iam}^2) * \omega^2$$

and:

$$R_m = \frac{\frac{R_{eam} + R_{iam}}{2} + \frac{R_{eav} + R_{iav}}{2}}{2}$$

where:
$\omega$ is expressed in revolutions per minute;
$\sigma_1$ is −0.4 rpm⁻²·m⁻²;
$\chi_1$ is 0.784;
$R_{eam}, R_{iam}, R_{eav}, R_{iav}$ and $R_v$ are expressed in meters; and
$N2S_{am}$ is expressed in 10⁶·rpm²·m²;
wherein the ratio $$\frac{R_v}{R_m}$$

is strictly positive and strictly less than 1;
  wherein the shroud radius $R_v$ is comprised in a range from 0.05 to 0.8 meters inclusive, the upstream outer radius $R_{eam}$ and the downstream outer radius $R_{eav}$ are comprised in a range from 0.15 to 1.0 meters inclusive, the downstream inner radius $R_{iav}$ and the upstream inner radius $R_{iam}$ are comprised in a range from 0.1 to 0.8 meters inclusive, $R_m$ is comprised in a range from 0.05 to 1.0 meters inclusive and $N2S_{am}$ is comprised in a range from 30*10⁶ rpm²·m² to 180*10⁶ rpm²·m² inclusive.

According to one mode of implementation, the dimensioning of the at least one shroud, the dimensioning of the first turbine blade and the dimensioning of the second turbine blade are implemented so that the shroud radius $R_v$, the upstream outer radius $R_{eam}$, the upstream inner radius $R_{iam}$, the downstream outer radius $R_{eav}$, the downstream inner radius $R_{iav}$ and the limit speed ω are such that:

$$\sigma_2 * \frac{N2S_{am}}{100} + \chi_2 \le \frac{R_v}{R_m}$$

where:
$\sigma_2$ is $-0.512$ rpm$^{-2}$·m$^2$
$\chi_2$ is 0.82;
$R_m$ and $R_v$ are expressed in meters; and
$N2S_{am}$ is expressed in $10^6$·rpm$^2$·m$^2$.

DESCRIPTION OF THE FIGURES

Other characteristics, aims and advantages will emerge from the following description, which is purely illustrative and not limiting, and should be read in relation to the appended figures, in which:

FIG. 8A is a schematic perspective view of an example of a blade of a rotor stage of the turbine section of a propulsion system.

FIG. 8B is a side view of FIG. 8A.

In all the figures, similar elements bear identical references.

DETAILED DESCRIPTION

Figure 1:
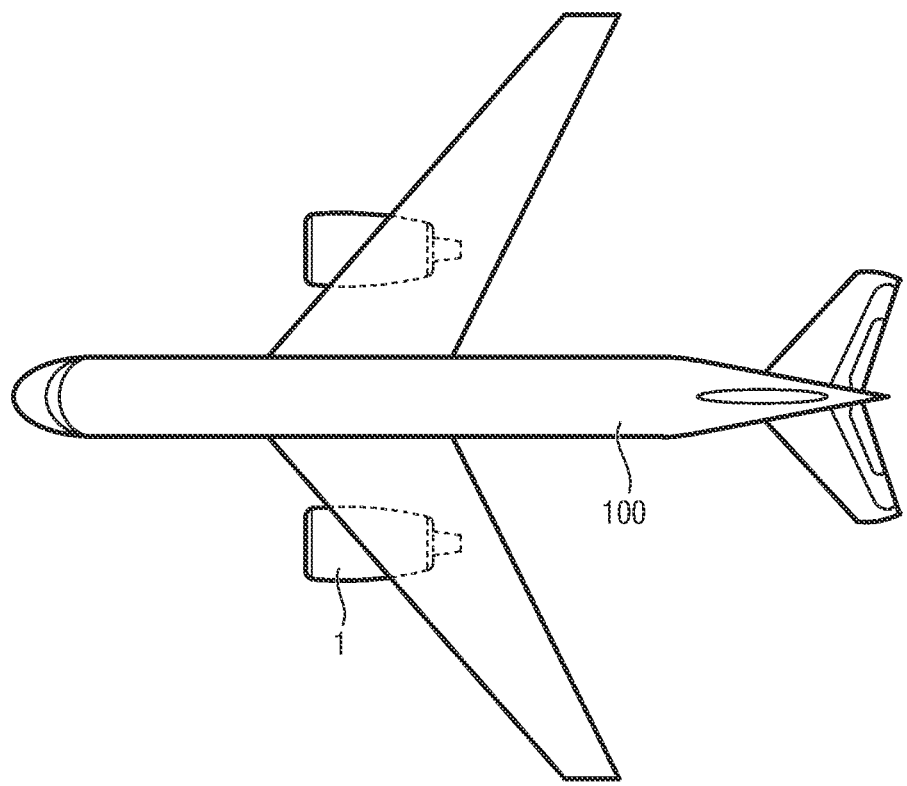
FIG. 1 illustrates an example of an aircraft that can comprise a propulsion system.

A propulsion system 1 has a main direction extending along a longitudinal axis X and comprises, from upstream to downstream in the gas flow direction in the propulsion system 1 when it is in operation, a fan section 2 and a primary spool 3, often called "gas generator", including a compressor section 4, 5, a combustion chamber 6 and a turbine section 7, 8. The propulsion system 1 is here an aeronautical propulsion system 1 configured to be fixed to the airframe of an aircraft 100 via a pylon (or mast).

The compressor section 4, 5 comprises a succession of stages each comprising a blade wheel (rotor) 4a, 5a rotating in front of a vane wheel (stator) 4b, 5b. The turbine section 7, 8 also comprises a succession of stages each comprising a vane wheel (stator) 7b, 8b behind which a blade wheel (rotor) 7a, 8a rotates.

In the present disclosure, the axial direction corresponds to the direction of the longitudinal axis X, in correspondence with the rotation of the shafts 10, 11 of the primary spool 3, and a radial direction is a direction perpendicular to this longitudinal axis X and passing therethrough. Moreover, the circumferential (or lateral, or even tangential) direction corresponds to a direction perpendicular to the longitudinal axis X and not passing therethrough. Unless otherwise specified, inner (respectively, internal) and outer (respectively, external), respectively, are used with reference to a radial direction so that the inner part or face of an element is closer to the longitudinal axis X as the outer part or face of the same element.

In operation, an air stream F entering the propulsion system 1 is divided between a primary air stream F1 and a secondary air stream F2, which circulate from upstream to downstream in the propulsion system 1.

The secondary air stream F2, also called "bypass air stream", flows around the primary spool 3. The secondary air stream F2 makes it possible to cool the periphery of the primary spool 3 and serves to generate most of the thrust provided by the propulsion system 1.

The primary air stream F1 flows in a primary flowpath 29 inside the primary spool 3, passing successively through the compressor section 4, 5, the combustion chamber 6 where it is mixed with fuel to serve as oxidizer, and the turbine section 7, 8. The passage of the primary air stream F1 through the turbine section 7, 8 receiving energy from the combustion chamber 6 causes a rotation of the rotor stages 7a, 8a of the turbine section 7, 8, which in turn drive in rotation the rotor stages 4a, 5a of the compressor section 4, 5 as well as a rotor 9 of the fan section 2.

In a two-spool propulsion system 1, the compressor section 4, 5 can comprise a low-pressure compressor 4 and a high-pressure compressor 5. The turbine section 7, 8 can comprise a high-pressure turbine 7 and a low-pressure turbine 8. The rotor stages 5a of the high-pressure compressor 5 are driven in rotation by the rotor stages 7a of the high-pressure turbine 7 via a high-pressure shaft 10. The rotor stages 4a of the low-pressure compressor 4 and the rotor 9 of the fan section 2 are driven in rotation by the rotor stages 8a of the low-pressure turbine 8 via a low-pressure shaft 11. Thus, the primary spool 3 comprises a high-pressure spool comprising the high-pressure compressor 5, the high-pressure turbine 7 and the high-pressure shaft 10, and a low-pressure spool comprising the fan section 2, the low-pressure compressor 4, the low-pressure turbine 8 and the low-pressure shaft 11. The rotation speed of the high-pressure spool is higher than the rotation speed of the low-pressure spool. In a triple-spool propulsion system 1, the turbine section 7, 8 further comprises an intermediate turbine, positioned between the high-pressure turbine 7 and the low-pressure turbine 8 and whose rotor stages are configured to drive the rotor stages of the low-pressure compressor 4 via an intermediate shaft. The rotor 9 of the fan section 2 and the rotor stages of the high-pressure compressor 5 remain driven by the low-pressure shaft 11 and the high-pressure shaft 10, respectively.

The low-pressure shaft 11 is generally housed, over a segment of its length, in the high-pressure shaft 10 and is coaxial with the high-pressure shaft 10. The low-pressure shaft 11 and the high-pressure shaft 10 can be co-rotating, that is to say driven in the same direction about the longitudinal axis X. As a variant, the low-pressure shaft 11 and the high-pressure shaft 10 are counter-rotating that is to say they are driven in opposite directions about the longitudinal axis X. Where applicable, the intermediate shaft is housed between the high-pressure shaft 10 and the low-pressure shaft 11. The intermediate shaft and the low-pressure shaft 11 can be co-rotating or counter-rotating.

The fan section 2 comprises at least the rotor 9 capable of being driven in rotation relative to a stator part 19e of the propulsion system 1 by at least one rotor part of the turbine section 7, 8. Each rotor 9 of the fan section fan 2 comprises a hub 13 and blades 14 extending radially from the hub 13. The blades 14 of each rotor 9 can be stationary relative to the hub 13 or have a variable setting. In this case, the root of the blades 14 of each rotor 9 is pivotally mounted along a setting axis and is connected to a pitch change mechanism 15 mounted in the propulsion system 1, the setting being adjusted according to the flight phases by the pitch change mechanism 15. The rotor 9 of the fan section 2 moreover comprises at least fourteen blades 14 and at most twenty-four blades 14, preferably at least sixteen blades 14 and at most twenty-two blades 14.

The fan section 2 can further comprise a stator 16, or straightener, which comprises vanes 17 mounted on a hub of the stator 16 and have the function of straightening the secondary air stream F2 which flows at the outlet of the rotor 9. The vanes 17 of the stator 16 can be stationary relative to the hub of the stator 16 or have a variable setting. Where applicable, and similarly to the rotor 9 blades 14, the root of the stator 16 vanes 17 is pivotally mounted along a setting axis and is connected to a pitch change mechanism 15a, which is generally distinct from that of the rotor 9, the setting being adjusted according to the flight phases by the pitch change mechanism 15a. The number of vanes 17 in the stator 16 depends on the acoustic criteria defined for the propulsion system 1 and is at least equal to the number of blades 14 in the rotor 9.

In order to improve the propulsive efficiency of the propulsion system 1 and to reduce its specific consumption as well as the noise emitted by the fan section 2, the propulsion system 1 has a high bypass ratio. By "high" bypass ratio it is meant a bypass ratio greater than or equal to 10, for example comprised between 10 and 80 inclusive. To calculate the bypass ratio, the mass flow rate of the secondary air stream F2 and the mass flow rate of the primary air stream F1 are related to each other, by being measured when the propulsion system 1 is stationary, not installed, in take-off mode in a standard atmosphere (as defined by the International Civil Aviation Organization (ICAO) manual, Doc 7488/3, 3rd edition) and at sea level. In the present disclosure, the parameters (pressure, flow rate, thrust, speed, etc.) are systematically determined under these conditions. By "not installed", it is meant that the measurements are performed when the propulsion system 1 is on a test bench (and not installed on an aircraft 100), the measurements then being simpler to carry out. The distances, or dimensions (length, width, radius, diameter, etc.), are, for their part, measured at ambient temperature (approximately 20° C.) when the propulsion system 1 is cold, that is to say when the propulsion system 1 is stopped for a sufficient period in order for the parts of the propulsion system 1 to be at ambient temperature, it being understood that these dimensions vary little compared to the conditions in which the propulsion system 1 would be in take-off mode.

The rotor 9 of the fan section 2 can be decoupled from the low-pressure shaft 11 using a reduction mechanism 19, placed between an upstream end of the low-pressure shaft 11 and the rotor 9, in order to independently optimize their respective rotation speed. In this case, the propulsion system 1 further comprises an additional shaft, called "fan shaft 20". The low-pressure shaft 11 connects the rotor stages 8a of the low-pressure turbine 8 to an inlet of the reduction mechanism 19 while the fan shaft 20 connects the outlet of the reduction mechanism 19 to the rotor 9 of the fan section 2. The rotor 9 of the fan section 2 is therefore driven by the low-pressure shaft 11 via the reduction mechanism 19 and the fan shaft 20 at a rotation speed lower than the rotation speed of the low-pressure turbine 8.

This decoupling makes it possible to reduce the rotation speed and the pressure ratio of the rotor 9 of the fan section 2 and to increase the power extracted by the low-pressure turbine 8. Indeed, the overall efficiency of the propulsion systems is conditioned to the first order by the propulsive efficiency, which is favorably influenced by minimization of the variation in the kinetic energy of the air when crossing the propulsion system 1. In a propulsion system 1 with a high bypass ratio, most of the flow rate generating the propulsive force is made up of the secondary air stream F2 of the propulsion system 1, the kinetic energy of the secondary air stream F2 being mainly affected by the compression that the secondary air stream F2 undergoes when crossing the fan section 2. The propulsive efficiency and the pressure ratio of the fan section 2 are therefore linked: the lower the pressure ratio of the fan section 2, the better the propulsive efficiency will be. In order to improve the propulsive efficiency of the propulsion system 1, the pressure ratio of the fan section 2, which corresponds to the ratio between the average pressure at the outlet of the stator 16 of the fan section 2 (or, in the absence of the stator 16, at the outlet of the rotor 9) and the average pressure at the inlet of the rotor 9 of the fan section 2, is less than or equal to 1.70, preferably less than or equal to 1.50, for example comprised between 0.90 and 1.45. The average pressures are measured here over the height of at least one of the blades 14 of the rotor 9 that is to say of the surface which delimits radially inside the air flowpath at the inlet of the rotor 9 at the top 21 of the blade 14.

The rotor 9 of the fan section 1 can alternatively be directly coupled to the low-pressure shaft 11 (or direct-drive), that is to say without a reduction mechanism. The low-pressure shaft 11 is then coincident with the fan shaft 20 so that the rotor 9 is driven by the low-pressure shaft 11 at the same rotation speed as that of the rotor stages 8a of the low-pressure turbine 8.

The propulsion system 1 is configured to provide a thrust comprised between 18,000 lbf (80,068 N) and 51,000 lbf (226,859 N), preferably between 20,000 lbf (88,964 N) and 35,000 lbf (155,688 N).

The fan section 2 can be ducted or unducted.

In the case of a ducted fan section 2, the fan section 2 comprises a fan casing 12 and the rotor 9 is housed in the fan casing 12. A ducted fan section 2 comprises a rotor 9 extending upstream of a stator 16. The vanes 17 of the stator 16 are then generally referred to as "outlet vanes" (or OGV for Outlet Guide Vane) and have a fixed setting relative to the hub of the stator 16. Moreover, the bypass ratio of the propulsion system 1 is preferably greater than or equal to 10, for example comprised between 10 and 35 inclusive, preferably between 10 and 18 inclusive. The peripheral speed at the top 21 of the blades 14 of the rotor 9 can moreover be comprised between 260 m·s$^{-1}$ and 400 m·s$^{-1}$ inclusive. The fan pressure ratio can then be comprised between 1.20 and 1.45.

In an unducted fan section 2, the fan section 2, which can also be designated by the term "propeller", is not surrounded by a fan casing. The fan section 2 being unducted, the blades 14 of the rotor 9 have a variable setting. Propulsion systems comprising at least one unducted rotor 9 are known under the terms "open rotor" or "unducted fan". The propulsion system 1 can comprise two unducted and counter-rotating rotors 9. Such a propulsion system 1 is known under the acronym "CROR" for "Contra-Rotating Open Rotor" or "UDF" for "Unducted Double Fan". The rotors 9 can be placed at the rear of the primary spool 3 so as to be of the pusher type or at the front of the primary spool 3 so as to be of the puller type. As a variant, the propulsion system 1 can comprise a single unducted rotor 9 and an unducted stator 16 (straightener). Such a propulsion system 1 is known under the acronym "USF" for "Unducted Single Fan". In the case of a propulsion system 1 of the USF type, the vanes 17 of the straightener 16 are fixed in rotation relative to the axis of rotation X of the rotor 9 and, therefore, do not undergo centrifugal force. The vanes 17 of the straightener 16 are, moreover, variable setting vanes.

The removal of the fairing around the fan section 2 makes it possible to increase the bypass ratio very significantly without the propulsion system 1 being penalized by the mass of the casings 12 or nacelles intended to surround the fan section 2. The bypass ratio of the propulsion system 1 comprising an unducted fan section 2 is thus greater than or equal to 40, for example comprised between 40 and 80 inclusive. The peripheral speed at the top 21 of the blades 14 of the rotor(s) 9 can moreover be comprised between 210 m·s$^{-1}$ and 260 m·s$^{-1}$ inclusive. The fan pressure ratio can then be preferably comprised between 0.90 and 1.20 inclusive.

Figure 2:
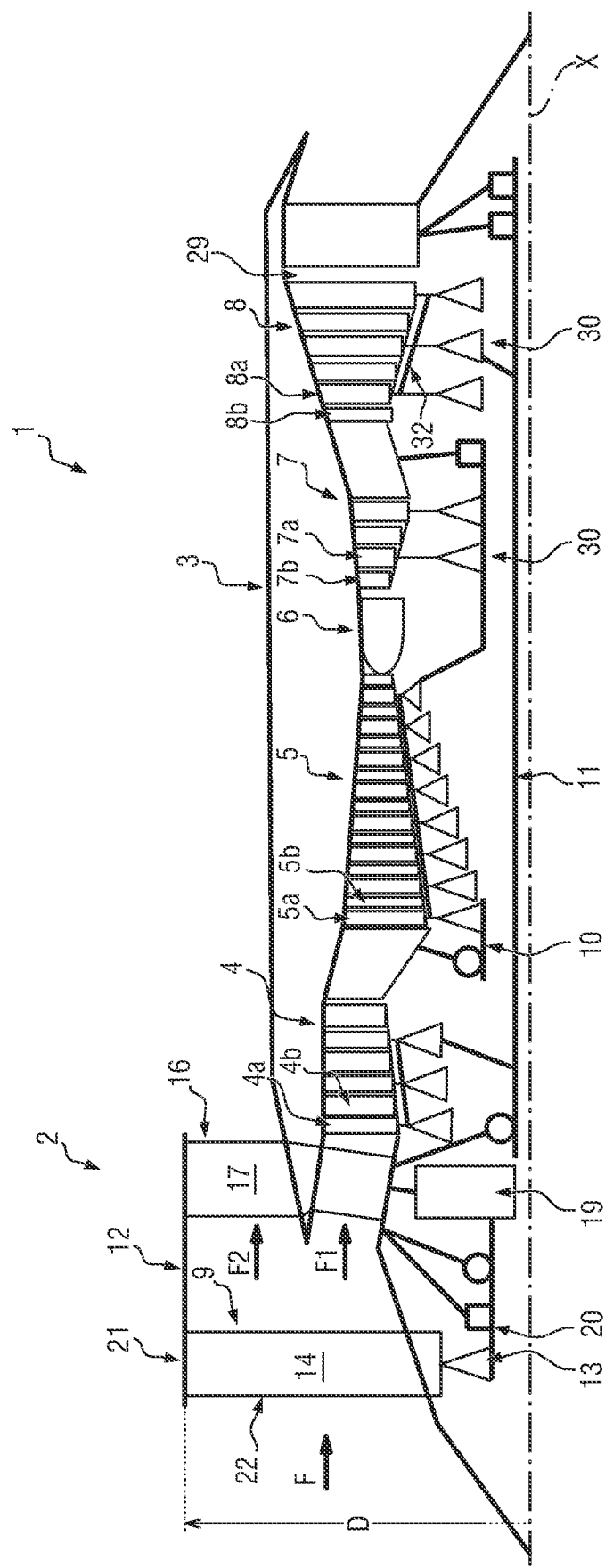
FIG. 2 is a schematic, partial and sectional view of an example of a propulsion system in which the fan section is ducted.
Figure 3:
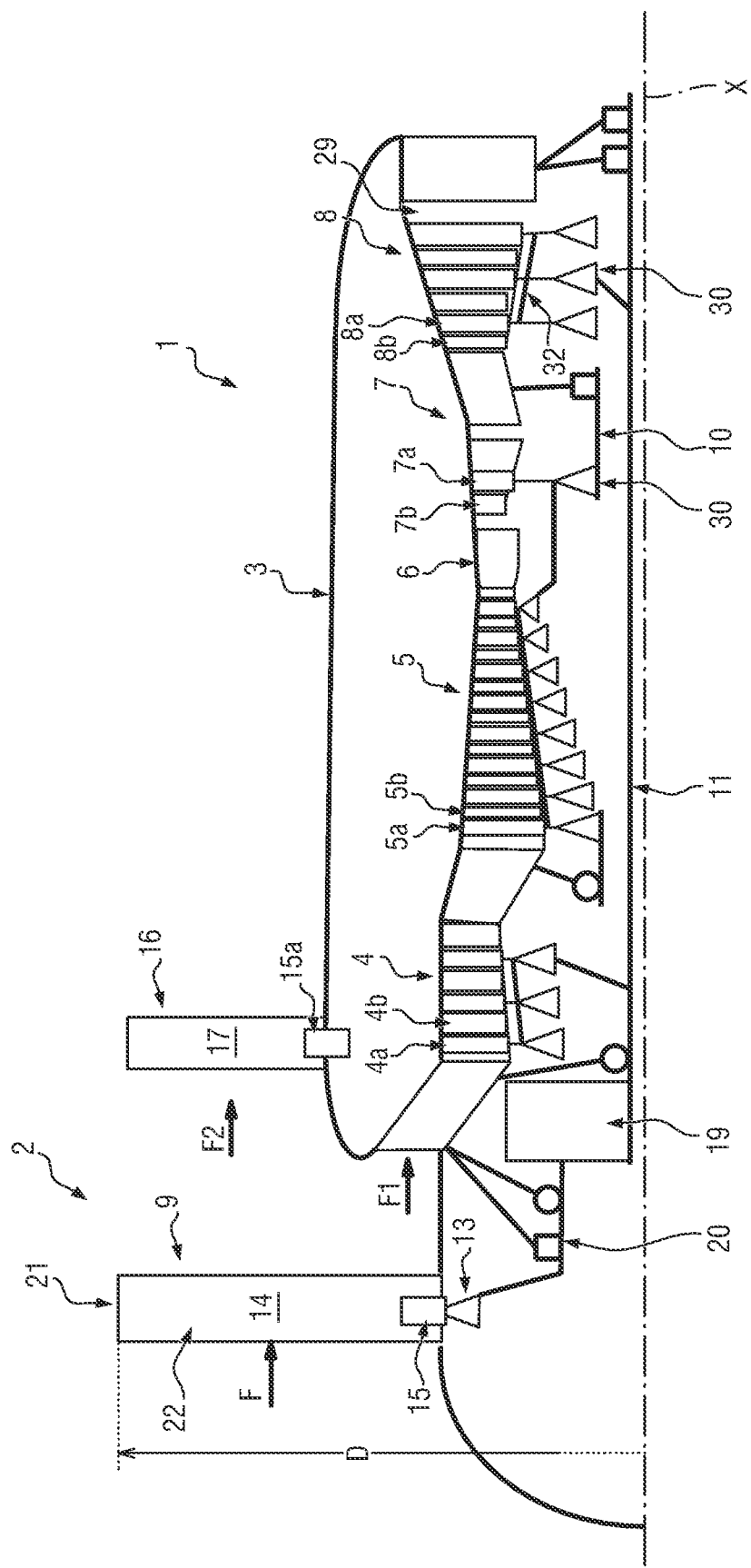
FIG. 3 is a schematic, partial and sectional view of an example of a propulsion system in which the fan section is unducted.

The diameter D of the rotor 9 of the fan section 2 can be comprised between 80 inches (203.2 cm) and 185 inches (469.9 cm) inclusive. When the rotor 9 is ducted, the diameter D is preferably comprised between 85 inches (215.9 cm) and 120 inches (304.8 cm) inclusive, for example of the order of 90 inches (228.6 cm), which allows the integration of the propulsion system 1 in a conventional manner, particularly under a wing of the airframe of an aircraft 1. When the rotor 9 is unducted, the diameter D is preferably greater than or equal to 100 inches (254 cm), for example between 120 inches (304.8 cm) and 156 inches (396.2 cm). The diameter of the rotor 9 is measured here in a plane normal to the axis of rotation X of the rotor 9, at the level of an intersection between a top 21 and a leading edge 22 of the blades 14 of the rotor 9. It should be noted that, FIG. 2 and FIG. 3 being partial views, the diameter D is only partially visible.

Figure 4:
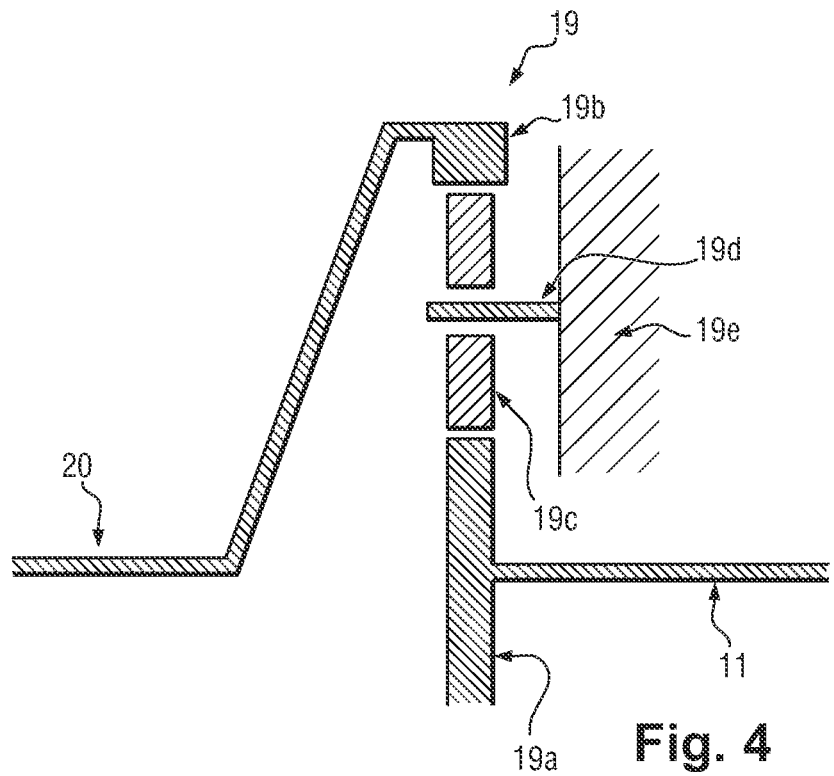
FIG. 4 is a schematic sectional view of an example of a star gear reduction mechanism.
Figure 5:
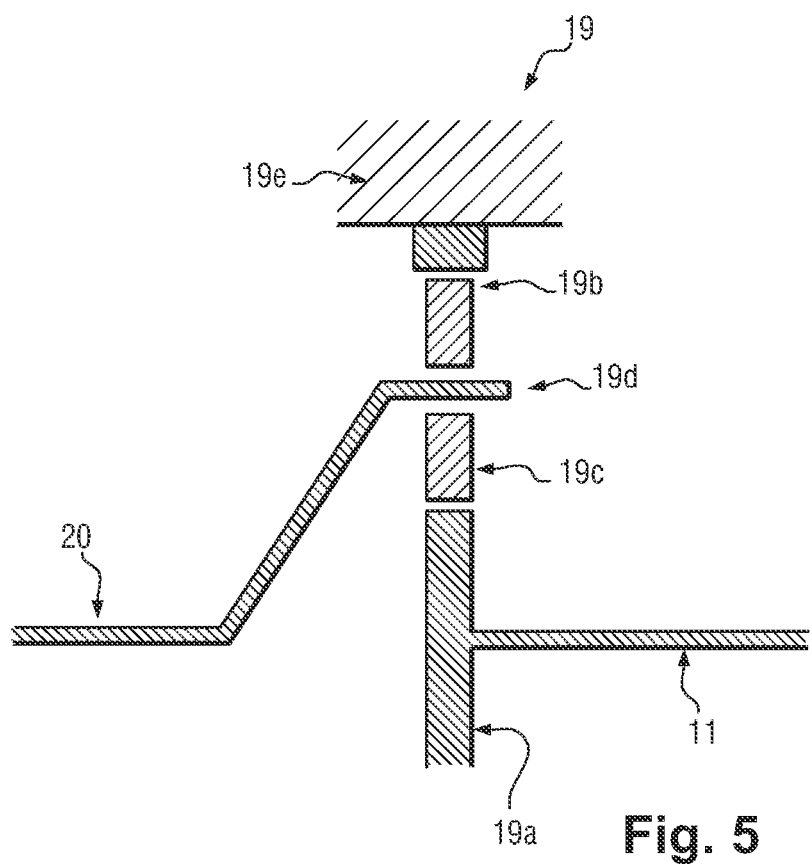
FIG. 5 is a schematic sectional view of an example of an planetary gear reduction mechanism.
Figure 6:
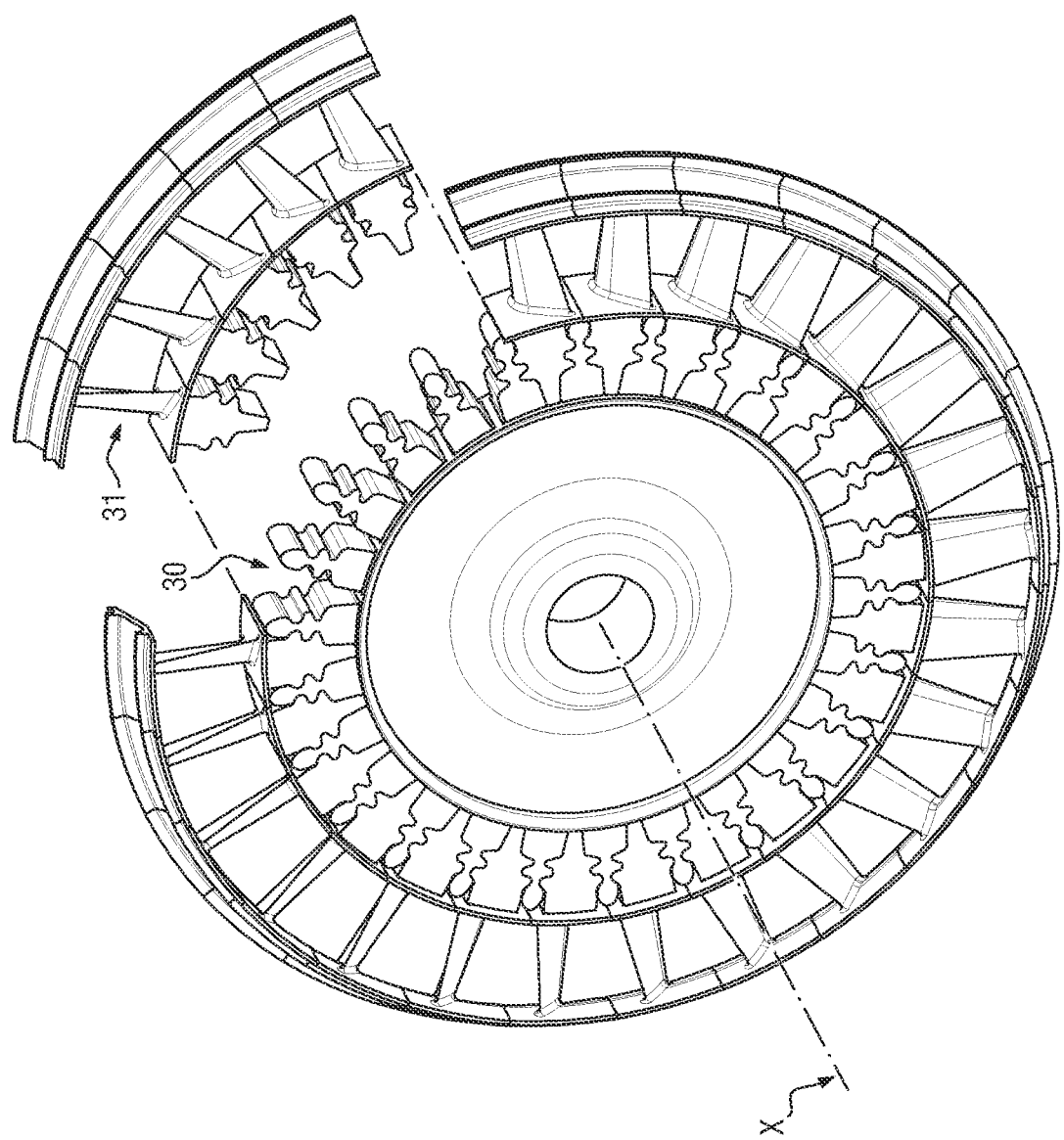
FIG. 6 is a schematic perspective view of an example of a rotor stage of the turbine section of a propulsion system.
Figure 7:
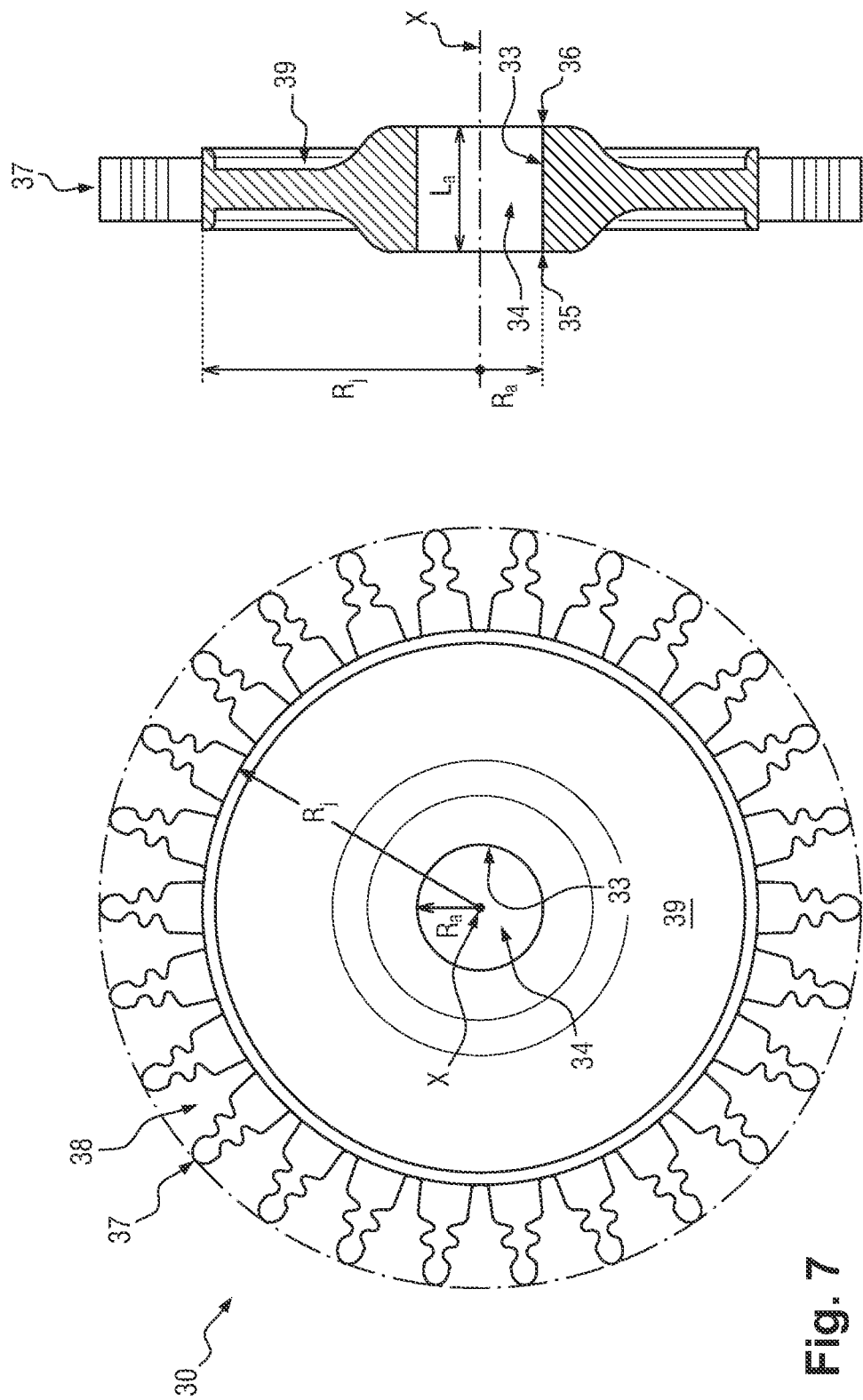
FIG. 7 illustrates a schematic front view and a schematic sectional view of an example of a disk of a rotor stage of the turbine section of a propulsion system.
Figure 9:
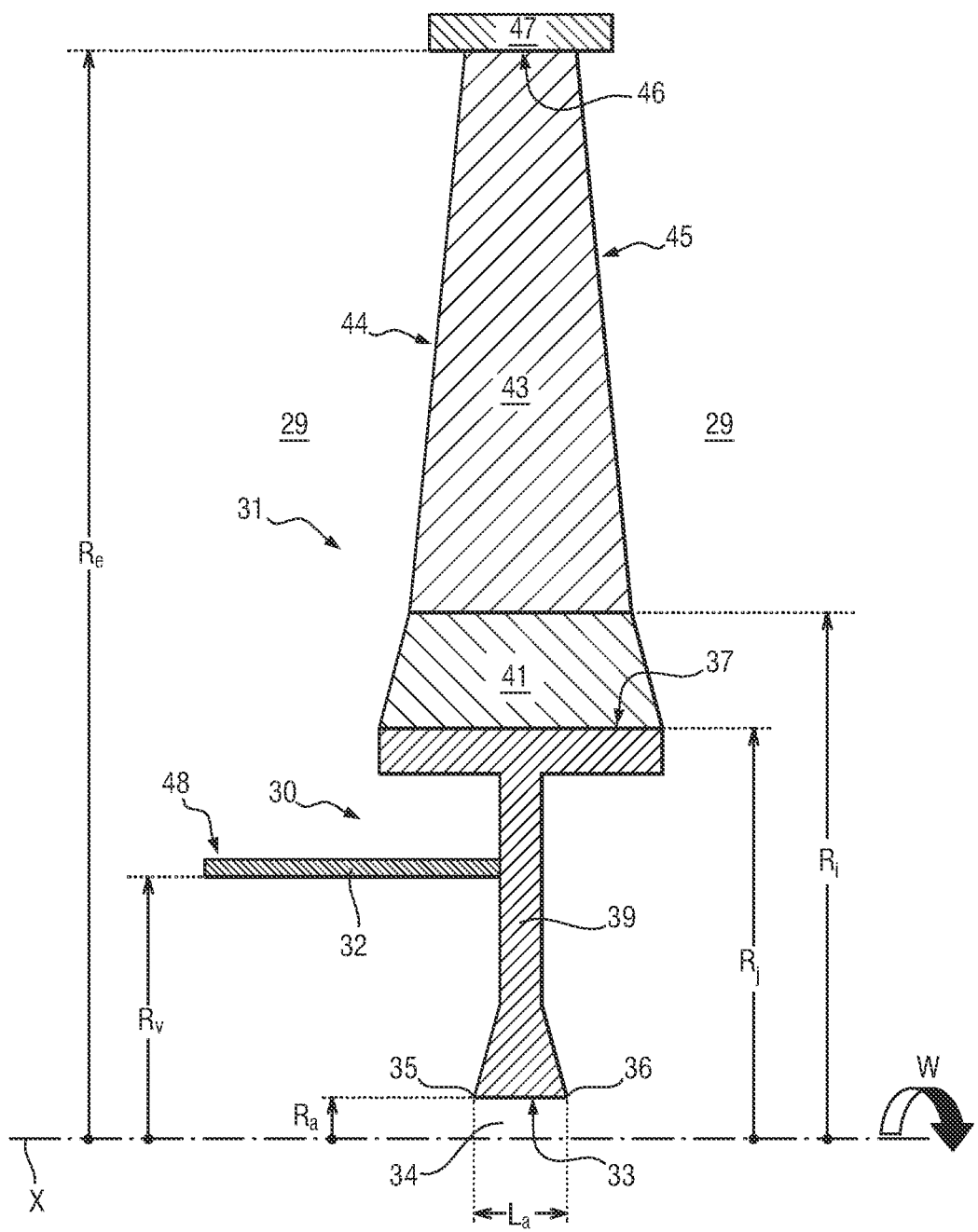
FIG. 9 is a schematic sectional view of an example of a rotor stage of the turbine section of a propulsion system.
Figure 10:
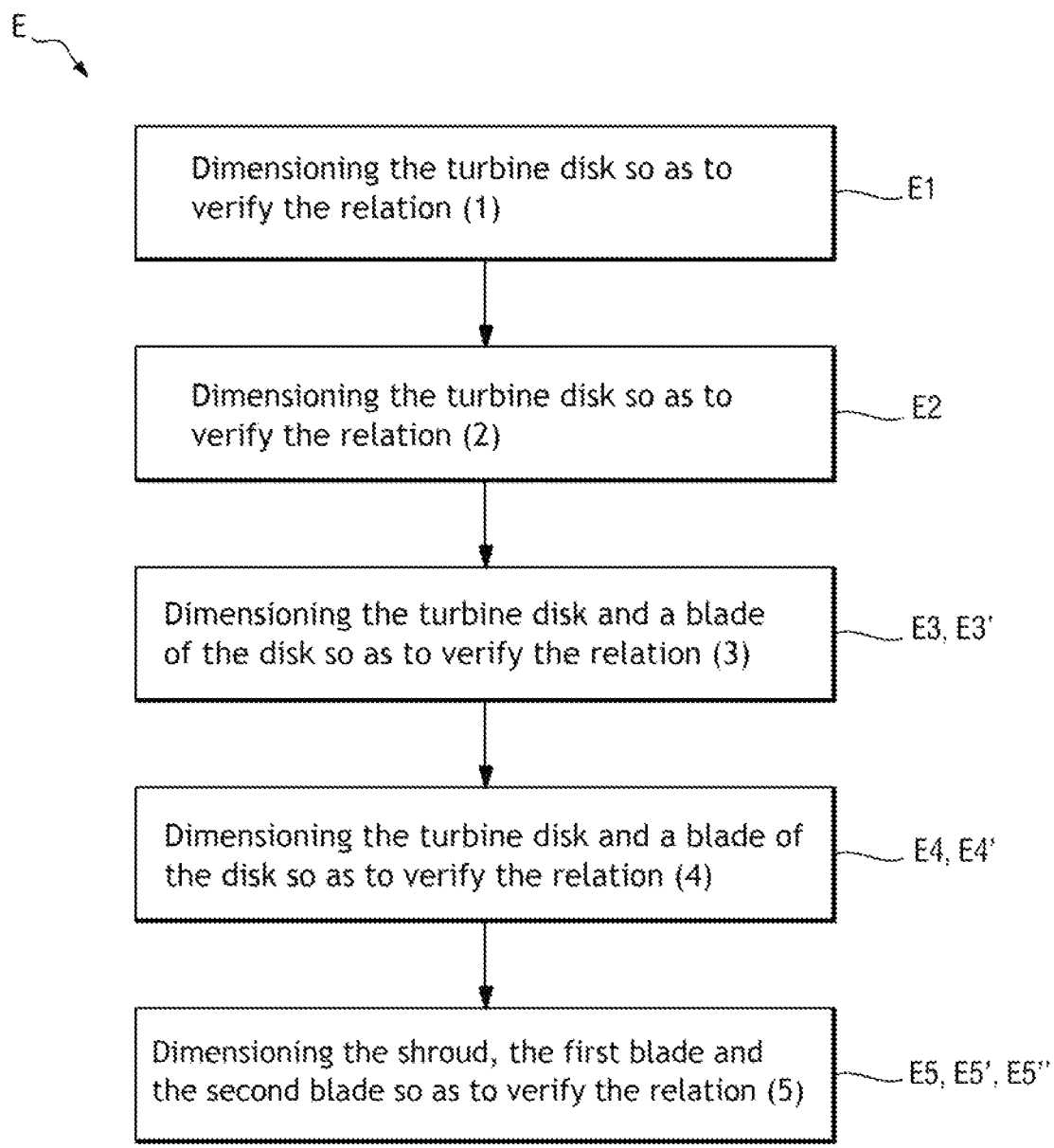
FIG. 10 is a flowchart illustrating steps of one example of implementation of a method for manufacturing a propulsion system.

The reduction mechanism 19 can comprise a planetary gear or star gear, single-stage or two-stage reduction mechanism. For example, the reduction mechanism 19 can be of the star gear (as visible in FIG. 4) type and comprise a sun pinion 19a (inlet of the reduction mechanism 19), centered on an axis of rotation of the reduction mechanism 19 generally coincident with the longitudinal axis X and configured to be driven in rotation by the low-pressure shaft 11, a ring gear 19b (outlet of the reduction mechanism 19) coaxial with the sun pinion 19a and configured to drive in rotation the fan shaft 20 about its axis of rotation X, and a series of planet gears 19c distributed circumferentially about the axis of rotation X of the rotor 9 of the fan section 2, between the sun pinion 19a and the ring gear 19b, each planet gear 19c being meshed internally with the sun pinion 19a and externally with the ring gear 19b. The series of planet gears 19c is mounted on a planet gear carrier 19d which is stationary relative to the stator part 19e of the propulsion system 1, for example relative to a casing of the compressor section 4, 5. As a variant, the reduction mechanism 19 can be of the planetary gear (as visible in FIG. 5) type, in which case the ring gear 19b is fixedly mounted on the stator part 19e of the propulsion system 1 and the fan shaft 20 is driven in rotation by the planet gear carrier 19d.

Whatever the configuration of the reduction mechanism 19, the diameter of the ring gear 19b and of the planet gear carrier 19d are greater than the diameter of the sun pinion 19a, so that the rotation speed of the rotor 9 of the fan section 2 is lower than the rotation speed of the low-pressure shaft 11.

The reduction ratio of the reduction mechanism 19 is greater than or equal to 2.5 and less than or equal to 11. In the case of a propulsion system 1 comprising a rotor 9 of the fan section 2 which is ducted, the reduction ratio can be greater than or equal to 2.7 and less than or equal to 3.5, typically around 3.0. In the case of a propulsion system 1 comprising a rotor 9 of the fan section 2 which is unducted, the reduction ratio can be comprised between 9.0 and 11.0.

The two-spool propulsion system 1 can in particular comprise a single-stage high-pressure turbine 7 that is to say comprising exactly one stage, or a two-stage high-pressure turbine that is to say comprising exactly two stages, a high-pressure compressor 5 comprising at least eight stages and at most eleven stages, a low-pressure turbine 8 comprising at least three stages and at most seven stages and a low-pressure compressor 4 comprising at least two stages and at most four stages.

The limit speed ω (or redline speed) of the low-pressure shaft 11, which corresponds to the absolute maximum speed likely to be encountered by the low-pressure shaft 11, and therefore by the rotor stages 4a, 8a of the low-pressure spool, during the entire flight (according to the European certification regulation EASA CS-E 740 or according to the American certification regulation 14-CFR Part 33.87), is comprised between 2,000 revolutions per minute (209 radians per second) and 30,000 revolutions per minute (3,142 radians per second) inclusive, for example between 8,500 revolutions per minute (890 radians per second) and 12,000 revolutions per minute (1,267 radians per second) inclusive, preferably between 9,000 revolutions per second) minute (942 radians per second) and 11,000 revolutions per minute inclusive (1,152 radians per second). The limit speed corresponds to the maximum rotation speed when the propulsion system 1 is sound, that is to say it is not at the end of its life. It is therefore likely to be reached by the low-pressure shaft 11 in flight conditions. This limit speed forms part of the data declared in the engine certification (or type certificate data sheet). Indeed, this rotation speed is commonly used as a reference speed for the dimensioning of the propulsion systems and in some certification tests, such as blade loss or rotor integrity tests. Of course, the high-pressure shaft 10, and therefore the rotor stages 5a, 7a of the high-pressure spool, also has a limit speed, defined in the same way as for the low-pressure shaft 11, but greater than that of the low-pressure shaft, for example comprised between 8,000 revolutions per minute and 30,000 revolutions per minute inclusive.

The stator 16 of the fan section, the stator stages 4b, 5b of the compressor section 4, 5, the stator stages 7b, 8b of the turbine section 7, 8 and the stator part 19e of the propulsion system 1 are stationary relative to each other and relative to the mast making it possible to fix the propulsion system 1 to the airframe of the aircraft.

In order to optimize the performances of the propulsion system 1, and in particular to reduce its fuel consumption, without limiting its lifespan, it is advantageous to improve the dimensioning of at least one of the rotor stages 8a of the low-pressure turbine 8.

Each rotor stage 8a of the low-pressure turbine 8 comprises a disk 30 and a plurality of blades 31. Furthermore, the rotor stages 8a of the low-pressure turbine 8 are connected together by means of a plurality of shrouds 32 connecting in pairs the disks 30 of the rotor stages 8a.

The disk 30 is bored. More specifically, the disk 30 has an inner surface 33 delimiting a bore 34 passing axially through the disk 30. The bore 34 is circular and centered on the longitudinal axis X when the disk 30 is mounted in the propulsion system 1. A bore radius $R_a$ of the disk 30 is then defined as a smallest distance between the longitudinal axis X and the inner surface 33 of the disk 30 that is to say as the distance separating the longitudinal axis X from the point of the inner surface 33 which is closest to the longitudinal axis X. The bore radius $R_a$ can be comprised between 0.01 and 0.5 meters inclusive, depending, in particular, on the considered rotor stage 8a of the low-pressure turbine 8. The inner surface 33 moreover has an upstream edge 35 and a downstream edge 36, which form the axial ends of the bore 34. A bore width $L_a$ of the disk 30 is defined as an axial distance between the upstream edge 35 and the downstream edge 36 that is to say as the distance separating the upstream edge 35 from the point of the downstream edge 36 which is closest to the upstream edge 35 or, conversely, as the distance separating the downstream edge 36 from the point of the upstream edge 35 which is closest to the downstream edge 36. The bore width $L_a$ can be comprised between 0.005 and 0.1 meters inclusive, depending, in particular, on the considered rotor stage 8a of the low-pressure turbine 8. The low-pressure shaft 11 extends through the bores 34 of the disks 30 of the low-pressure turbine 8 while being fixed to at least one of the disks 30 of the low-pressure turbine 8, to be able to be driven in rotation by the rotor stages 8a during the expansion of the hot gases circulating from the high-pressure turbine 7.

Furthermore, the disk 30 has an outer surface 37 delimiting a plurality of slots 38 distributed about the longitudinal axis X and extending axially. Each of the slots 38 is configured to ensure the fixing, in a removable or non-removable manner, of one of the blades 31 on the disk 30. In this regard, each slot 38 is open on the primary flowpath 29 when the disk 30 is mounted in the propulsion system 1, and can have any shape suitable for fixing the blades 31, typically a dovetail or fir tree shape, with at least one, or even several, lobe(s). A rim radius $R_j$ of the disk 30 is defined as a smallest distance between the longitudinal axis X and the outer surface 37 of the disk 30 that is to say as the distance separating the longitudinal axis X from the point of the outer surface 37 which is closest to the longitudinal axis X, otherwise called the "rim" of the disk 30. In other words, the rim radius $R_j$ of the disk 30 corresponds to the radius of the slot bottom 38 that is to say the distance separating the deepest (innermost) point of the (radially) deepest of the slots 38 from the longitudinal axis X. The rim radius $R_j$ can be comprised between 0.01 and 0.5 meters inclusive, depending, in particular, on the considered rotor stage 8a of the low-pressure turbine 8. A tangential rim speed $U_j$ of the disk 30 is defined as the rotation speed of the rim that is to say the rotation speed of the point of the outer surface 37 which is closest to the longitudinal axis X, about of the longitudinal axis X, when the low-pressure shaft 11 is at its limit speed $\omega$. Thus, the tangential rim speed $U_j$ of the disk 30 is $R_j*\omega$. The tangential rim speed $U_j$ can be comprised between 100 and 500 m·s$^{-1}$ inclusive, depending, in particular, on the considered rotor stage 8a of the low-pressure turbine 8.

The portion of the disk 30 which extends from the rim to the bore 34 is sometimes called "web 39" of the disk 30. The web 39 contributes to transmitting the mechanical loads, in particular radial loads, within the rotor stage 8a of the low-pressure turbine 8, during the operation of the propulsion system 1. A critical radius of the rotor stage 8a is defined as the distance separating the longitudinal axis X from the position of a critical limit which separates the rotor stage 8a in two radially distinct parts: a radially inner part and a radially outer part, the radially inner part retaining the radially outer part against the centrifugal forces, during the operation of the propulsion system 1. The critical limit is generally positioned within the web 39 of the disk 30. In any case, the performances of the web 39 to ensure the mechanical consistency of the rotor stage 8a are directly correlated to the bore radius $R_a$, to the bore width $L_a$ and to the rim radius $R_j$.

Each of the blades 31 comprises a root 40 fixed to the disk 30 by cooperation with one of the slots 38, a stilt 41 connected to the root 40 and comprising a platform 42 delimiting a radially inner portion of the primary flowpath 29, an airfoil 43 connected to the platform 42 and extending within the primary flowpath 29. The airfoil 43 has an aerodynamic profile and has, in this regard, a leading edge 44 on which the hot gases strike first, when they meet the stage rotor 8a, a trailing edge 45 axially opposite to the leading edge 44, and an end 46 radially opposite to the platform 42. The airfoil 43 interacts with the hot gases flowing from the low-pressure turbine 7 to drive the disk 30 in rotation about the longitudinal axis X. To do so, the airfoil 43 extends within the primary flowpath 29 with a certain incidence relative to the main gas flow direction. The blade 31 can further comprise a shroud 47, extending from the end 46 of the airfoil 43, by being removably or non-removably fixed therein, or by being integral with the airfoil 43. The shroud 47 ensures the sealing of the primary flowpath 29 by limiting the hot gas leaks at the interface between each rotor stage 8a and the low-pressure turbine casing 8, to which the stator stages 8b are fixed. In this regard, the shroud 47 carries sealing lips intended to cooperate with an abradable material extending from the casing of the low-pressure turbine 8.

An outer radius $R_e$ of the primary flowpath 29, at the level of the disk 30, is defined as an average between, on the one hand, a distance between the longitudinal axis X and a junction (or corner point) between the end 46 of the airfoil 43, where applicable a junction between the end 46 of the airfoil 43 and the shroud 47, and the leading edge 44 of the airfoil 43 and, on the other hand, a distance between the longitudinal axis X and a junction between the end 46 of the airfoil 43, where applicable a junction between the end 46 of the airfoil 43 and the shroud 47, and the trailing edge 45 of the airfoil 43. The outer radius $R_e$ of the primary flowpath 29 can be comprised between 0.15 and 1.0 meters inclusive, depending, in particular, on the considered rotor stage 8a of the low-pressure turbine 8.

An inner radius $R_i$ of the primary flowpath 29, at the level of the disk 30, is defined as an average between, on the one hand, a distance between the longitudinal axis X and a junction between the platform 42 and the leading edge 44 of the airfoil 43 and, on the other hand, a distance between the longitudinal axis X and a junction between the platform 42 and the trailing edge 45 of the airfoil 43. The inner radius $R_i$ of the primary flowpath 29 can be comprised between 0.1 and 0.8 meters inclusive, depending, in particular, on the considered rotor stage 8a of the low-pressure turbine 8. A tangential inner flowpath speed $U_i$ of the disk 30 is defined as the rotation speed of the junction between the platform 42 and the airfoil 43, about the longitudinal axis X, when the low-pressure shaft 11 is at its limit speed ω. Thus, the tangential inner flowpath speed $U_i$ of the disk 30 is $R_i*ω$. The tangential inner flowpath speed $U_i$ can be comprised between 100 and 500 m·s$^{-1}$ inclusive, depending, in particular, on the considered rotor stage 8a of the low-pressure turbine 8.

Each rotor stage 8a of the low-pressure turbine 8 has a mechanical difficulty N2S which is $\pi*(R_e^2-R_i^2)*ω^2$ and which can be comprised between $30*10^6$ rpm$^2$·m$^2$ and $180*10^6$ rpm$^2$·m$^2$ inclusive.

Each of the shrouds 32 has an outer surface 48 facing the stator stage 8b positioned between the two rotor stages 8a that the shroud 32 connects. A shroud radius $R_v$ is defined as a smallest distance between the longitudinal axis and the outer surface 48 of the shroud 32 that is to say as the distance separating the longitudinal axis X from the point of the outer surface 48 which is closest to the longitudinal axis X. The shroud radius $R_v$ can be comprised between 0.05 and 0.8 meters inclusive, depending, in particular, on the considered shroud 32 of the low-pressure turbine 8. An average radius $R_m$ of the primary flowpath 29 at the level of the shroud 32 is defined as an average between, on the one hand, an average between the upstream outer radius $R_{eam}$ and the upstream inner radius $R_{iam}$ of the primary flowpath 29, at the level of the disk 30 immediately upstream of the shroud 32 and, on the other hand, an average between the downstream outer radius $R_{eav}$ and the downstream inner radius $R_{iav}$ of the primary flowpath 29, at the level of the disk 30 immediately downstream of the shroud 32, the shroud 32 connecting the upstream disk 30 to the downstream disk 30. The average radius $R_m$ of the primary flowpath 29 at the level of the shroud 32 can be comprised between 0.05 and 1.0 meters inclusive, depending, in particular, on the considered shroud 32 of the low-pressure turbine 8.

When the rotor stages 8a of the low-pressure turbine 8 are driven in rotation about the longitudinal axis X, following the expansion of the hot gases through the turbine section 7, 8, the disks 30 are subjected to centrifugal forces all the greater as the rotation speed of these rotor stages 8a is high. The intensity of these forces is therefore directly correlated to the tangential rim speed $U_j$ and/or to the tangential inner flowpath speed $U_i$. These forces induce tangential and radial deformations of the disks 30, due to their centrifugal expansion.

The deformations of the disks 30 can be accentuated by the presence of the blades 31, which are also subject to centrifugal forces passed on to the disks 30 by the cooperation of their root 40 with the corresponding slot 38 of the disk 30. In this regard, the mechanical difficulty N2S is in particular representative of the stress exerted by the airfoil 43 on the stilt 41 and, therefore, on the disk 30, both tangentially and radially.

These deformations induce tangential and radial stresses within the rotor stages 8a of the low-pressure turbine 8 which may, depending on the dimensions of the rotor stages 8a and on the limits of admissibility of the materials which compose them, damage them, thus reducing their lifespan, but also the capacity of the disks 30 to retain the blades 31.

To reduce these stresses, it could be envisaged to increase the dimensions of the disks 30 and/or of the shrouds 32, typically by reducing the bore radii $R_a$, by increasing the bore widths $L_a$, by increasing the rim radii $R_j$ and/or by increasing the shroud radii $R_v$. However, this would lead to an increase in the bulk of the low-pressure turbine 8, which directly affects the compactness of the propulsion system 1 and, consequently, the fuel consumption of the aircraft 100.

To improve both the performances and the compactness of the propulsion system 1, it is in particular provided, within the framework of the present disclosure, a method E for manufacturing the propulsion system 1 which comprises steps E1, E2, E3, E3', E4, E4', E5, E5', E5" of dimensioning the rotor stages 8a of the low-pressure turbine 8.

During a step E1 of dimensioning at least one of the disks 30 of the rotor stages 8a of the low-pressure turbine 8, the bore radius $R_a$ and the rim radius $R_j$ are chosen such that the relation (1a) below is verified:

$$\alpha * U_j + \beta_1 \leq \frac{R_a}{R_j}$$

with:

$$U_j = R_j * \omega$$

where:
ω is the speed of the low-pressure shaft 11 defined previously, expressed in radians per second;
α is −0.0027 m$^{-1}$·s;
$β_1$ is 0.4;
$R_a$ and $R_j$ are expressed in meters; and
$U_j$ is expressed in meters per second.

In this way, the radial bulk of the disk 30 and, consequently, of the rotor stage 8a is reduced, without the centrifugal forces it undergoes due to the increase in the tangential rim speed $U_j$, for improving the efficiency of the propulsion system 1, significantly reducing its lifespan.

Preferably, the bore radius $R_a$ and the rim radius $R_j$ are chosen such that the relation (1b) below is verified:

$$\alpha * U_j + \beta_2 \leq \frac{R_a}{R_j}$$

where:
α is −0.0027 m$^{-1}$·s;
$β_2$ is 1.2951;
$R_a$ and $R_j$ are expressed in meters; and
$U_j$ is expressed in meters per second.
The ratio $$\frac{R_a}{R_j}$$

is strictly positive, since the rim radius $R_j$ and the bore radius $R_a$ are physical quantities whose measurement is strictly positive. Furthermore, the ratio $$\frac{R_a}{R_j}$$

is strictly less than 1, because the rim radius $R_j$ is strictly greater than the bore radius $R_a$.

Moreover, during a step E2 of dimensioning at least one of the disks 30 of the rotor stages 8a of the low-pressure turbine 8, which may or may not be coincident with the step E1 of dimensioning the disk 30 during which the relation (1) is verified, the bore width $L_a$ and the rim radius $R_j$ are chosen such that the relation (2a) below is verified:

$$\frac{100 * L_a}{R_j} \leq \delta * \frac{U_j^2}{1,000} + \zeta_1$$

with:

$$U_j = R_j * \omega$$

where:
- $\omega$ is the speed of the low-pressure shaft 11 defined previously, expressed in radians per second;
- $\delta$ is 0.2424 $s^2 \cdot m^{-2}$;
- $\zeta_1$ is 10;
- $L_a$ and $R_j$ are expressed in meters; and
- $U_j$ is expressed in meters per second.

In this way, the axial bulk of the disk 30 and, consequently, of the rotor stage 8a is reduced, without the centrifugal forces it undergoes due to the increase in the tangential rim speed $U_j$, for improving the efficiency of the propulsion system 1, significantly reducing its lifespan.

Preferably, the bore width $L_a$ and the rim radius $R_j$ are chosen such that the relation (2b) below is verified:

$$\frac{100 * L_a}{R_j} \leq \delta * \frac{U_j^2}{1,000} + \zeta_2$$

where:
- $\delta$ is 0.2424 $s^2 \cdot m^{-2}$;
- $\zeta_2$ is $-8$;
- $L_a$ and $R_j$ are expressed in meters; and
- $U_j$ is expressed in meters per second.

The ratio $$\frac{100 * L_a}{R_j}$$

is strictly positive, since the rim radius $R_j$ and the bore width $L_a$ are physical quantities whose measurement is strictly positive.

Furthermore, during a step E3 of dimensioning at least one of the disks 30 of the rotor stages 8a, which may or may not be coincident with the step(s) E1, E2 of dimensioning the disk 30 during which the relation (1) and/or relation (2) is (are) verified, and during a step E3' of dimensioning at least one of the blades 31 of this disk 30, the bore radius $R_a$, the rim radius $R_j$, the outer radius $R_e$ and the inner radius $R_i$ are chosen such that the relation (3a) below is verified:

$$\kappa * N2S + \lambda_1 \leq \frac{R_a}{R_j}$$

with:

$$N2S = \pi * (R_e^2 - R_i^2) * \omega^2$$

where:
- $\omega$ is the speed of the low-pressure shaft 11 defined previously, expressed in revolutions per minute (rpm);
- $\kappa$ is $-0.0091$ $rpm^{-2} \cdot m^{-2}$;
- $\lambda_1$ is 0.3;
- $R_a$, $R_j$, $R_e$ and $R_i$ are expressed in meters; and
- N2S is expressed in $10^6 \cdot rpm^2 \cdot m^2$.

In this way, the radial bulk of the rotor stage 8a is reduced, without the centrifugal forces it undergoes due to the increase in the mechanical difficulty N2S, for improving the efficiency of the propulsion system 1, significantly reducing its lifespan.

Preferably, the bore radius $R_a$, the rim radius $R_j$, the outer radius $R_e$ and the inner radius $R_i$ are chosen such that the relation (3b) below is verified:

$$\kappa * N2S + \lambda_2 \leq \frac{R_a}{R_j}$$

where:
- $\kappa$ is $-0.0091$ $rpm^{-2} \cdot m^{-2}$;
- $\lambda_2$ is 0.864;
- $R_a$ and $R_j$ are expressed in meters; and
- N2S is expressed in $10^6 \cdot rpm^2 \cdot m^2$.

The ratio $$\frac{R_a}{R_j}$$

is strictly positive, since the rim radius $R_j$ and the bore radius $R_a$ are physical quantities whose measurement is strictly positive. Furthermore, the ratio $$\frac{R_a}{R_j}$$

is strictly less than 1, because the rim radius $R_j$ is strictly greater than the bore radius $R_a$.

During a step E4 of dimensioning at least one of the disks 30 of the rotor stages 8a, which may or may not be coincident with the step(s) E1, E2, E3, E3' of dimensioning the disk 30 during which the relation (1), the relation (2) and/or the relation (3) is (are) verified, and during a step E4' of dimensioning at least one of the blades 31 of this disk 30, which may or may not be coincident with the step E3' of dimensioning the blade 31 during which the relation (3) is verified, the bore width $L_a$ and the inner radius $R_i$ are chosen such that relation (4a) below is verified:

$$\frac{100 * L_a}{R_i} \leq \nu * \frac{U_i^2}{1,000} + \xi_1$$

with:

$$U_i = R_i * \omega$$

where:
ω is the speed of the low-pressure shaft 11 defined previously, expressed in radians per second;
ν is 0.079 s$^2$·m$^{-2}$;
$\xi_1$ is 2.28;
$L_a$ and $R_i$ are expressed in meters; and
$U_i$ is expressed in meters per second.

In this way, the axial bulk of the rotor stage 8$a$ is reduced without the centrifugal forces it undergoes due to the increase in the tangential inner flowpath speed $U_i$, for improving the efficiency of the propulsion system 1, significantly reducing its lifespan.

Preferably, the bore width $L_a$ and the inner radius $R_i$ are chosen such that the relation (4b) below is verified:

$$\frac{100 * L_a}{R_i} \leq \nu * \frac{U_i^2}{1{,}000} + \xi_2$$

where:
ν is 0.079 s$^2$·m$^{-2}$;
$\xi_2$ is −1.41;
$L_a$ and $R_i$ are expressed in meters; and
$U_i$ is expressed in meters per second.

The ratio $$\frac{100 * L_a}{R_i}$$

is strictly positive, since the inner radius $R_i$ and the bore width $L_a$ are physical quantities whose measurement is strictly positive.

During a step E5 of dimensioning at least one of the shrouds 32 of the low-pressure turbine 8 connecting an upstream disk 30 to a downstream disk 30, during a step E5' of dimensioning at least one of the first blades 31 of the upstream disk 30 and during a step E5" of dimensioning at least one of the second blades 31 of the downstream disk 30, the shroud radius $R_v$ and the average radius $R_m$ of the primary flowpath 29 are chosen such that the relation (5a) below is verified:

$$\sigma_1 * \frac{N2S_{am}}{100} + \chi_1 \leq \frac{R_v}{R_m}$$

with:

$$N2S_{am} = \pi * (R_{eam}^2 - R_{iam}^2) * \omega^2$$

and:

$$R_m = \frac{\frac{R_{eam} + R_{iam}}{2} + \frac{R_{eav} + R_{iav}}{2}}{2}$$

where:
ω is the speed of the low-pressure shaft 11 defined previously, expressed in revolutions per minute (rpm);
$\sigma_1$ is −0.4 rpm$^{-2}$·m$^{-2}$;
$\chi_1$ is 0.784;
$R_{eam}$, $R_{iam}$, $R_{eav}$, $R_{iav}$ and $R_v$ are expressed in meters; and
$N2S_{am}$ is expressed in 10$^6$·rpm$^2$·m$^2$.

In this way, the radial bulk of the shroud 32 and, consequently, of the rotor stages 8$a$ it connects, is reduced, without the centrifugal forces undergone by these rotor stages 8$a$ due to the increase in the mechanical difficulty N2S, for improving the efficiency of the propulsion system 1, significantly reducing its lifespan.

Preferably, the shroud radius $R_v$ and the average radius $R_m$ of the primary flowpath 29 are chosen such that the relation (5b) below is verified:

$$\sigma_2 * \frac{N2S_{am}}{100} + \chi_2 \leq \frac{R_v}{R_m}$$

where:
$\sigma_2$ is −0.512 rpm$^{-2}$·m$^{-2}$
$\chi_2$ is 0.82;
$R_m$ and $R_v$ are expressed in meters; and
$N2S_{am}$ is expressed in 10$^6$·rpm$^2$·m$^2$.

The ratio $$\frac{R_v}{R_m}$$

is strictly positive, since the shroud radius $R_v$ and the average radius $R_m$ of the primary flowpath 29 are physical quantities whose measurement is strictly positive. Furthermore, the ratio $$\frac{R_v}{R_m}$$

is strictly less than 1, because the average radius $R_m$ of the primary flowpath 29 is strictly greater than the shroud radius $R_v$.

Surprisingly, a propulsion system 1 obtained at the end of this manufacturing method E or a propulsion system 1 obtained by another manufacturing method, but whose low-pressure turbine 8 has dimensions conforming to at least one of the relations (1) to (5), has the advantage of being sufficiently compact to limit the fuel consumption of the aircraft 100 to which it is fixed, while allowing an improvement in its performances through the increase of the limit speed of its low-pressure shaft 11.

The relations (1) to (5) can therefore be used during the design of propulsion systems in order, in particular, to determine the feasibility of the rotor stages 8$a$ of the low-pressure turbine 8. Indeed, these relations make it possible to improve both the compactness and the efficiency of the propulsion systems.

The invention claimed is:
1. A propulsion system comprising:
   a drive shaft;
   a drive turbine comprising a drive turbine stator and a drive turbine rotor, the drive turbine rotor being connected to the drive shaft to drive it in rotation relative to the drive turbine stator about a longitudinal axis, the drive turbine rotor comprising a turbine disk and a plurality of turbine blades;
   a fan section comprising a fan rotor and a fan stator, the drive shaft being connected to the fan rotor to drive it in rotation relative to the fan stator about the longitudinal axis;

wherein the turbine disk is centered on the longitudinal axis and has:
an inner surface delimiting a circular bore passing through the turbine disk and centered on the longitudinal axis;
an outer surface delimiting a plurality of slots distributed about the longitudinal axis,
a bore radius $R_a$ which is defined as a smallest distance between the longitudinal axis and the inner surface of the turbine disk; and
a rim radius $R_j$ which is defined as a smallest distance between the longitudinal axis and the outer surface of the turbine disk;
wherein at least one turbine blade of the plurality of turbine blades further comprises:
a root fixed to the turbine disk in a respective slot of the plurality of slots;
a stilt connected to the root and comprising a platform delimiting a radially inner portion of a flowpath passing through the drive turbine; and
an airfoil connected to the platform and extending within the flowpath, the airfoil having a leading edge, a trailing edge and an end opposite to the platform;
wherein the flowpath has:
an outer radius $R_e$ which is defined as an average between, on the one hand, a distance between the longitudinal axis and a junction between the end of the airfoil and the leading edge of the airfoil and, on the other hand, a distance between the longitudinal axis and a junction between the end of the airfoil and the trailing edge of the airfoil; and
an inner radius $R_i$ which is defined as an average between, on the one hand, a distance between the longitudinal axis and a junction between the platform and the leading edge of the airfoil and, on the other hand, a distance between the longitudinal axis and a junction between the platform and the trailing edge of the airfoil;
wherein the drive shaft has a limit speed w which is defined as the highest speed at which the drive shaft is capable of being driven in rotation about the longitudinal axis during the operation of the propulsion system;
wherein the bore radius $R_a$, the rim radius $R_j$, the outer radius $R_e$, the inner radius $R_i$ and the limit speed $\omega$ are such that:

$$\kappa * N2S + \lambda_1 \leq \frac{R_a}{R_j}$$

with:

$$N2S = \pi * (R_e^2 - R_i^2) * \omega^2$$

where:
$\omega$ is expressed in revolutions per minute (rpm);
$\kappa$ is $-0.0091$ rpm$^{-2} \cdot$m$^{-2}$;
$\lambda_1$ is 0.3;
$R_a$, $R_j$, $R_e$ and $R_i$ are expressed in meters; and
N2S is expressed in $10^6 \cdot$rpm$^2 \cdot$m$^2$;
wherein the ratio $$\frac{R_a}{R_j}$$

is strictly positive and strictly less than 1;

wherein the bore radius $R_a$ is comprised in a range from 0.01 to 0.5 meters inclusive, the rim radius $R_j$ is comprised in a range from 0.01 to 0.5 meters inclusive, the limit speed $\omega$ is comprised in a range from 2,000 rpm to 30,000 rpm inclusive, the outer radius $R_e$ is comprised in a range from 0.15 to 1.0 meters inclusive, the inner radius $R_i$ is comprised in a range from 0.1 to 0.8 meters inclusive and N2S is comprised in a range from $30*10^6$ rpm$^2 \cdot$m$^2$ to $180*10^6$ rpm$^2 \cdot$m$^2$ inclusive.

2. The propulsion system of claim 1, wherein the bore radius $R_a$, the rim radius $R_j$, the outer radius $R_e$, the inner radius $R_i$ and the limit speed $\omega$ are such that:

$$\kappa * N2S + \lambda_2 \leq \frac{R_a}{R_j}$$

where:
$\kappa$ is $-0.0091$ rpm$^{-2} \cdot$m$^{-2}$;
$\lambda_2$ is 0.864;
$R_a$ and $R_j$ are expressed in meters; and
N2S is expressed in $10^6 \cdot$rpm$^2 \cdot$m$^2$.

3. The propulsion system of claim 1, wherein the bore radius $R_a$, the rim radius $R_j$ and the limit speed $\omega$ are such that:

$$\alpha * U_j + \beta_1 \leq \frac{R_a}{R_j}$$

with:

$$U_j = R_j * \omega$$

where:
$\omega$ is expressed in radians per second;
$\alpha$ is $-0.0027$ m$^{-1} \cdot$s;
$\beta_1$ is 0.4;
$R_a$ and $R_j$ are expressed in meters; and
$U_j$ is expressed in meters per second;
wherein $U_j$ is comprised in a range from 100 to 500 m·s$^{-1}$ inclusive.

4. The propulsion system of claim 3, wherein the bore radius $R_a$, the rim radius $R_j$ and the limit speed $\omega$ are such that:

$$\alpha * U_j + \beta_2 \leq \frac{R_a}{R_j}$$

where:
$\alpha$ is $-0.0027$ m$^{-1} \cdot$s;
$\beta_2$ is 1.2951;
$R_a$ and $R_j$ are expressed in meters; and
$U_j$ is expressed in meters per second.

5. The propulsion system of claim 1, wherein the inner surface of the turbine disk has an upstream edge and a downstream edge and the turbine disk further has a bore width $L_a$ which is defined as an axial distance between the upstream edge and the downstream edge of the inner surface; and wherein the bore width $L_a$, the rim radius $R_j$ and the limit speed $\omega$ are such that:

$$\frac{100*L_a}{R_j} \le \delta * \frac{U_j^2}{1,000} + \zeta_1$$

with:

$$U_j = R_j * \omega$$

where:
$\omega$ is expressed in radians per second;
$\delta$ is 0.2424 s²·m⁻²;
$\zeta_1$ is 10;
$L_a$ and $R_j$ are expressed in meters; and
$U_j$ is expressed in meters per second;
wherein the ratio $$\frac{100*L_a}{R_j}$$

is strictly positive;
wherein the bore width $L_a$ is comprised in a range from 0.005 to 0.1 meters inclusive and $U_j$ is comprised in a range from 100 to 500 m·s⁻¹ inclusive.

6. The propulsion system of claim 5, wherein the bore width $L_a$, the rim radius $R_j$ and the limit speed $\omega$ are such that:

$$\frac{100*L_a}{R_j} \le \delta * \frac{U_j^2}{1,000} + \zeta_2$$

where:
$\delta$ is 0.2424 s²·m⁻²;
$\zeta_2$ is −8;
$L_a$ and $R_j$ are expressed in meters; and
$U_j$ is expressed in meters per second.

7. The propulsion system of claim 1, wherein the inner surface of the turbine disk has an upstream edge and a downstream edge and the turbine disk further has a bore width $L_a$ which is defined as an axial distance between the upstream edge and the downstream edge of the inner surface; and
wherein the bore width $L_a$, the inner radius $R_i$ and the limit speed $\omega$ are such that:

$$\frac{100*L_a}{R_i} \le \nu * \frac{U_i^2}{1,000} + \xi_1$$

with:

$$U_i = R_i * \omega$$

where:
$\omega$ is expressed in radians per second;
$\nu$ is 0.079 s²·m⁻²;
$\xi_1$ is 2.28;
$L_a$ and $R_i$ are expressed in meters; and
$U_i$ is expressed in meters per second;
wherein the ratio $$\frac{100*L_a}{R_i}$$

is strictly positive;
wherein the bore width $L_a$ is comprised in a range from 0.005 to 0.1 meters inclusive and $U_i$ is comprised in a range from 100 to 500 m·s⁻¹ inclusive.

8. The propulsion system of claim 7, wherein the bore width $L_a$, the inner radius $R_i$ and the limit speed $\omega$ are such that:

$$\frac{100*L_a}{R_i} \le \nu * \frac{U_i^2}{1,000} + \xi_2$$

where:
$\nu$ is 0.079 s²·m⁻²;
$\xi_2$ is −1.41;
$L_a$ and $R_i$ are expressed in meters; and
$U_i$ is expressed in meters per second.

9. The propulsion system of claim 1, wherein the drive turbine rotor comprises a plurality of shrouds, a plurality of turbine disks connected in pairs by a shroud of the plurality of shrouds, and a plurality of turbine blades;
wherein at least one shroud of the plurality of shrouds connects an upstream turbine disk to a downstream turbine disk of the plurality of turbine disks and has:
an outer surface facing the drive turbine stator; and
a shroud radius $R_V$ which is defined as a smallest distance between the longitudinal axis and the outer surface of the shroud;
wherein each of the upstream turbine disk and of the downstream turbine disk is centered on the longitudinal axis and has an outer surface delimiting a plurality of slots distributed about the longitudinal axis;
wherein a first turbine blade of the plurality of turbine blades comprises:
a first root fixed to the upstream turbine disk in a respective first slot of the plurality of slots of the upstream turbine disk;
a first stilt connected to the first root and comprising a first platform delimiting a first radially inner portion of a flowpath passing through the drive turbine; and
a first airfoil connected to the first platform and extending within the flowpath, the first airfoil having a first leading edge, a first trailing edge and a first end opposite to the first platform;
wherein a second turbine blade of the plurality of turbine blades comprises:
a second root fixed to the downstream turbine disk in a respective second slot of the plurality of slots of the downstream turbine disk;
a second stilt connected to the second root and comprising a second platform delimiting a second radially inner portion of the flowpath passing through the drive turbine; and
a second airfoil connected to the second platform and extending within the flowpath, the second airfoil having a second leading edge, a second trailing edge and a second end opposite to the second platform;

wherein the flowpath has:
an upstream outer radius $R_{eam}$ which is defined as an average between, on the one hand, a distance between the longitudinal axis and a junction between the first end and the first leading edge and, on the other hand, a distance between the longitudinal axis and a junction between the first end and the first trailing edge;
an upstream inner radius $R_{iam}$ which is defined as an average between, on the one hand, a distance between the longitudinal axis and a junction between the first platform and the first leading edge and, on the other hand, a distance between the longitudinal axis and a junction between the first platform and the first trailing edge;
a downstream outer radius $R_{eav}$ which is defined as an average between, on the one hand, a distance between the longitudinal axis and a junction between the second end and the second leading edge and, on the other hand, a distance between the longitudinal axis and a junction between the second end and the second trailing edge; and
a downstream inner radius $R_{iav}$ which is defined as an average between, on the one hand, a distance between the longitudinal axis and a junction between the second platform and the second leading edge and, on the other hand, a distance between the longitudinal axis and a junction between the second platform and the second trailing edge;
wherein the shroud radius $R_v$, the upstream outer radius $R_{eam}$, the upstream inner radius $R_{iam}$, the downstream outer radius $R_{eav}$, the downstream inner radius $R_{iav}$ and the limit speed ω are such that:

$$\sigma_1 * \frac{N2S_{am}}{100} + \chi_1 \le \frac{R_v}{R_m}$$

with:

$$N2S_{am} = \pi * (R_{eam}^2 - R_{iam}^2) * \omega^2$$

and:

$$R_m = \frac{\frac{R_{eam} + R_{iam}}{2} + \frac{R_{eav} + R_{iav}}{2}}{2}$$

where:
ω is expressed in revolutions per minute (rpm);
$\sigma_1$ is $-0.4$ rpm$^{-2}$·m$^{-2}$;
$\chi_1$ is 0.784;
$R_{eam}$, $R_{iam}$, $R_{eav}$, $R_{iav}$ and $R_v$ are expressed in meters; and
$N2S_{am}$ is expressed in $10^6$·rpm$^2$·m$^2$;
wherein the ratio $$\frac{R_v}{R_m}$$

is strictly positive and strictly less than 1;
wherein the shroud radius $R_v$ is comprised in a range from 0.05 to 0.8 meters inclusive, the upstream outer radius $R_{eam}$ and the downstream outer radius $R_{eav}$ are comprised in a range from 0.15 to 1.0 meters inclusive, the downstream inner radius $R_{iav}$ and the upstream inner radius $R_{iam}$ are comprised in a range from 0.1 to 0.8 meters inclusive, $R_m$ is comprised in a range from 0.05 to 1.0 meters inclusive and $N2S_{am}$ is comprised in a range from $30*10^6$ rpm$^2$·m$^2$ to $180*10^6$ rpm$^2$·m$^2$ inclusive.

10. The propulsion system of claim 9, wherein the shroud radius $R_v$, the upstream outer radius $R_{eam}$, the upstream inner radius $R_{iam}$, the downstream outer radius $R_{eav}$, the downstream inner radius $R_{iav}$ and the limit speed ω are such that:

$$\sigma_2 * \frac{N2S_{am}}{100} + \chi_2 \le \frac{R_v}{R_m}$$

where:
$\sigma_2$ is $-0.512$ rpm$^{-2}$·m$^{-2}$;
$\chi_2$ is 0.82;
$R_m$ and $R_v$ are expressed in meters; and
$N2S_{am}$ is expressed in $10^6$·rpm$^2$·m$^2$.

11. A method for manufacturing a propulsion system, the propulsion system comprising:
a drive shaft;
a drive turbine comprising a drive turbine stator and a drive turbine rotor, the drive turbine rotor being connected to the drive shaft to drive it in rotation relative to the drive turbine stator about a longitudinal axis, the drive turbine rotor comprising a turbine disk and a plurality of turbine blades;
a fan section comprising a fan rotor and a fan stator, the drive shaft being connected to the fan rotor to drive it in rotation relative to the fan stator about the longitudinal axis;
wherein the turbine disk is centered on the longitudinal axis and has:
an inner surface delimiting a circular bore passing through the turbine disk and centered on the longitudinal axis;
an outer surface delimiting a plurality of slots distributed about the longitudinal axis, a bore radius $R_a$ which is defined as a smallest distance between the longitudinal axis and the inner surface of the turbine disk; and
a rim radius $R_j$ which is defined as a smallest distance between the longitudinal axis and the outer surface of the turbine disk;
wherein at least one turbine blade of the plurality of turbine blades further comprises:
a root fixed to the turbine disk in a respective slot of the plurality of slots;
a stilt connected to the root and comprising a platform delimiting a radially inner portion of a flowpath passing through the drive turbine; and
an airfoil connected to the platform and extending within the flowpath, the airfoil having a leading edge, a trailing edge and an end opposite to the platform;
wherein the flowpath has:
an outer radius $R_e$ which is defined as an average between, on the one hand, a distance between the longitudinal axis and a junction between the end of the airfoil and the leading edge of the airfoil and, on the other hand, a distance between the longitudinal axis and a junction between the end of the airfoil and the trailing edge of the airfoil; and an inner radius $R_i$ which is defined as an average between, on the one hand, a distance between the longitudinal axis and a junction between the platform and the leading edge of the airfoil and, on the other hand, a distance between the longitudinal axis and a junction between the platform and the trailing edge of the airfoil;

wherein the drive shaft has a limit speed ω which is defined as the highest speed at which the drive shaft is capable of being driven in rotation about the longitudinal axis during the operation of the propulsion system;

wherein the method comprises dimensioning the at least one turbine blade and dimensioning the turbine disk such that the bore radius $R_a$, the rim radius $R_j$, the outer radius $R_e$, the inner radius $R_i$ and the limit speed ω are such that:

$$\kappa * N2S + \lambda_1 \leq \frac{R_a}{R_j}$$

with:

$$N2S = \pi * (R_e^2 - R_i^2) * \omega^2$$

where:
ω is expressed in revolutions per minute (rpm);
κ is $-0.0091$ rpm$^{-2}$·m$^{-2}$;
$\lambda_1$ is 0.3;
$R_a$, $R_j$, $R_e$ and $R_i$ are expressed in meters; and
N2S is expressed in $10^6$·rpm$^2$·m$^2$;
wherein the ratio $$\frac{R_a}{R_j}$$

is strictly positive and strictly less than 1;
wherein the bore radius $R_a$ is comprised in a range from 0.01 to 0.5 meters inclusive, the rim radius $R_j$ is comprised in a range from 0.01 to 0.5 meters inclusive, the limit speed ω is comprised in a range from 2,000 rpm to 30,000 rpm inclusive, the outer radius $R_e$ is comprised in a range from 0.15 to 1.0 meters inclusive, the inner radius $R_i$ is comprised in a range from 0.1 to 0.8 meters inclusive and N2S is comprised in a range from $30*10^6$ rpm$^2$·m$^2$ to $180*10^6$ rpm$^2$·m$^2$ inclusive.

12. The method of claim 11, wherein dimensioning the at least one turbine blade and dimensioning the turbine disk are such that the bore radius $R_a$, the rim radius $R_j$, the outer radius $R_e$, the inner radius $R_i$ and the limit speed ω are such that:

$$\kappa * N2S + \lambda_2 \leq \frac{R_a}{R_j}$$

where:
κ is $-0.0091$ rpm$^{-2}$·m$^{-2}$;
$\lambda_2$ is 0.864;
$R_a$ and $R_j$ are expressed in meters; and
N2S is expressed in $10^6$·rpm$^2$·m$^2$.

13. The method of claim 11, wherein dimensioning the turbine disk is further such that the bore radius $R_a$, the rim radius $R_j$ and the limit speed ω are such that:

$$\alpha * U_j + \beta_1 \leq \frac{R_a}{R_j}$$

with:

$$U_j = R_j * \omega$$

where:
ω is expressed in radians per second;
α is $-0.0027$ m$^{-1}$·s;
$\beta_1$ is $-0.4$;
$R_a$ and $R_j$ are expressed in meters; and
$U_j$ is expressed in meters per second;
wherein $U_j$ is comprised in a range from 100 to 500 m·s$^{-1}$ inclusive.

14. The method of claim 13, wherein dimensioning the turbine disk is further such that the bore radius $R_a$, the rim radius $R_j$ and the limit speed ω are such that:

$$\alpha * U_j + \beta_2 \leq \frac{R_a}{R_j}$$

where:
α is $-0.0027$ m$^{-1}$·s;
$\beta_2$ is 1.2951;
$R_a$ and $R_j$ are expressed in meters; and
$U_j$ is expressed in meters per second.

15. The method of claim 11, wherein the inner surface of the turbine disk has an upstream edge and a downstream edge and the turbine disk further has a bore width $L_a$ which is defined as an axial distance between the upstream edge and the downstream edge of the inner surface; and
wherein dimensioning the turbine disk is further such that the bore width $L_a$, the rim radius $R_j$ and the limit speed ω are such that:

$$\frac{100 * L_a}{R_j} \leq \delta * \frac{U_j^2}{1,000} + \zeta_1$$

with:

$$U_j = R_j * \omega$$

where:
ω is expressed in radians per second;
δ is 0.2424 s$^2$·m$^{-2}$;
$\zeta_1$ is 10;
$L_a$ and $R_j$ are expressed in meters; and
$U_j$ is expressed in meters per second;
wherein the ratio $$\frac{100 * L_a}{R_j}$$

is strictly positive;

wherein the bore width $L_a$ is comprised in a range from 0.005 to 0.1 meters inclusive and $U_j$ is comprised in a range from 100 to 500 m·s$^{-1}$ inclusive.

16. The method of claim 15, wherein dimensioning the turbine disk is further such that the bore width $L_a$, the rim radius $R_j$ and the limit speed ω are such that:

$$\frac{100 * L_a}{R_j} \le \delta * \frac{U_j^2}{1{,}000} + \zeta_2$$

where:
δ is 0.2424 s$^2$·m$^{-2}$;
$\zeta_2$ is −8;
$L_a$ and $R_j$ are expressed in meters; and
$U_j$ is expressed in meters per second.

17. The method of claim 11, wherein the inner surface of the turbine disk has an upstream edge and a downstream edge and the turbine disk further has a bore width $L_a$ which is defined as an axial distance between the upstream edge and the downstream edge of the inner surface; and
wherein dimensioning the at least one turbine blade, and dimensioning the turbine disk are further such that the bore width $L_a$, the inner radius $R_i$ and the limit speed ω are such that:

$$\frac{100 * L_a}{R_i} \le \nu * \frac{U_i^2}{1{,}000} + \xi_1$$

with:

$$U_i = R_i * \omega$$

where:
ω is expressed in radians per second;
ν is 0.079 s$^2$·m$^{-2}$;
$\xi_1$ is 2.28;
$L_a$ and $R_i$ are expressed in meters; and
$U_i$ is expressed in meters per second;
wherein the ratio $$\frac{100 * L_a}{R_i}$$

is strictly positive;
wherein the bore width $L_a$ is comprised in a range from 0.005 to 0.1 meters inclusive and $U_i$ is comprised in a range from 100 to 500 m·s$^{-1}$ inclusive.

18. The method of claim 17, wherein dimensioning the at least one turbine blade and dimensioning the turbine disk are such that the bore width $L_a$, the inner radius $R_i$ and the limit speed ω are such that:

$$\frac{100 * L_a}{R_i} \le \nu * \frac{U_i^2}{1{,}000} + \xi_2$$

where:
ν is 0.079 s$^2$·m$^{-2}$;
$\xi_2$ is −1.41;
$L_a$ and $R_i$ are expressed in meters; and
$U_i$ is expressed in meters per second.

19. The method of claim 11, wherein the drive turbine rotor comprises a plurality of shrouds, a plurality of turbine disks connected in pairs by a shroud of the plurality of shrouds, and a plurality of turbine blades;
wherein at least one shroud of the plurality of shrouds connects an upstream turbine disk to a downstream turbine disk of the plurality of turbine disks and has:
an outer surface facing the drive turbine stator; and
a shroud radius $R_V$ which is defined as a smallest distance between the longitudinal axis and the outer surface of the shroud;
wherein each of the upstream turbine disk and of the downstream turbine disk is centered on the longitudinal axis and has an outer surface delimiting a plurality of slots distributed about the longitudinal axis;
wherein a first turbine blade of the plurality of turbine blades comprises:
a first root fixed to the upstream turbine disk in a respective first slot of the plurality of slots of the upstream turbine disk;
a first stilt connected to the first root and comprising a first platform delimiting a first radially inner portion of a flowpath passing through the drive turbine; and
a first airfoil connected to the first platform and extending within the flowpath, the first airfoil having a first leading edge, a first trailing edge and a first end opposite to the first platform;
wherein a second turbine blade of the plurality of turbine blades comprises:
a second root fixed to the downstream turbine disk in a respective second slot of the plurality of slots of the downstream turbine disk;
a second stilt connected to the second root and comprising a second platform delimiting a second radially inner portion of the flowpath passing through the drive turbine; and
a second airfoil connected to the second platform and extending within the flowpath, the second airfoil having a second leading edge, a second trailing edge and a second end opposite to the second platform;
wherein the flowpath has:
an upstream outer radius $R_{eam}$ which is defined as an average between, on the one hand, a distance between the longitudinal axis and a junction between the first end and the first leading edge and, on the other hand, a distance between the longitudinal axis and a junction between the first end and the first trailing edge;
an upstream inner radius $R_{iam}$ which is defined as an average between, on the one hand, a distance between the longitudinal axis and a junction between the first platform and the first leading edge and, on the other hand, a distance between the longitudinal axis and a junction between the first platform and the first trailing edge;
a downstream outer radius $R_{eav}$ which is defined as an average between, on the one hand, a distance between the longitudinal axis and a junction between the second end and the second leading edge and, on the other hand, a distance between the longitudinal axis and a junction between the second end and the second trailing edge; and
a downstream inner radius $R_{iav}$ which is defined as an average between, on the one hand, a distance between the longitudinal axis and a junction between the second platform and the second leading edge and, on the other hand, a distance between the longitudinal axis and a junction between the second platform and the second trailing edge;

wherein the method further comprises dimensioning the at least one shroud, dimensioning the first turbine blade and dimensioning the second turbine blade such that the shroud radius $R_v$, the upstream outer radius $R_{eam}$, the upstream inner radius $R_{iam}$, the downstream outer radius $R_{eav}$, the downstream inner radius $R_{iav}$ and the limit speed $\omega$ are such that:

$$\sigma_1 * \frac{N2S_{am}}{100} + \chi_1 \leq \frac{R_v}{R_m}$$

with:

$$N2S_{am} = \pi * (R_{eam}^2 - R_{iam}^2) * \omega^2$$

and:

$$R_m = \frac{\frac{R_{eam} + R_{iam}}{2} + \frac{R_{eav} + R_{iav}}{2}}{2}$$

where:
$\omega$ is expressed in revolutions per minute (rpm);
$\sigma_1$ is $-0.4$ rpm$^{-2}\cdot$m$^{-2}$;
$\chi_1$ is 0.784;
$R_{eam}$, $R_{iam}$, $R_{eav}$, $R_{iav}$ and $R_v$ are expressed in meters; and
$N2S_{am}$ is expressed in $10^6 \cdot$rpm$^2\cdot$m$^2$;

wherein the ratio $$\frac{R_v}{R_m}$$

is strictly positive and strictly less than 1;
wherein the shroud radius $R_v$ is comprised in a range from 0.05 to 0.8 meters inclusive, the upstream outer radius $R_{eam}$ and the downstream outer radius $R_{eav}$ are comprised in a range from 0.15 to 1.0 meters inclusive, the downstream inner radius $R_{iav}$ and the upstream inner radius $R_{iam}$ are comprised in a range from 0.1 to 0.8 meters inclusive, $R_m$ is comprised in a range from 0.05 to 1.0 meters inclusive and $N2S_{am}$ is comprised in a range from $30*10^6$ rpm$^2\cdot$m$^2$ to $180*10^6$ rpm$^2\cdot$m$^2$ inclusive.

20. The method of claim 19, wherein dimensioning the at least one shroud, dimensioning the first turbine blade and dimensioning the second turbine blade are such that the shroud radius $R_v$, the upstream outer radius $R_{eam}$, the upstream inner radius $R_{iam}$, the downstream outer radius $R_{eav}$, the downstream inner radius $R_{iav}$ and the limit speed $\omega$ are such that:

$$\sigma_2 * \frac{N2S_{am}}{100} + \chi_2 \leq \frac{R_v}{R_m}$$

where:
$\sigma_2$ is $-0.512$ rpm$^{-2}\cdot$m$^{-2}$;
$\chi_2$ is 0.82;
$R_m$ and $R_v$ are expressed in meters; and
$N2S_{am}$ is expressed in $10^6 \cdot$rpm$^2\cdot$m$^2$.

* * * * *